US012513430B2

(12) United States Patent
Hirata et al.

(10) Patent No.: US 12,513,430 B2
(45) Date of Patent: Dec. 30, 2025

(54) SOLID-STATE IMAGING DEVICE, METHOD FOR DRIVING THE SAME, AND ELECTRONIC DEVICE FOR SIMULTANEOUSLY READING SIGNAL LEVELS OF DIFFERENT CAPACITIVE ELEMENTS

(71) Applicant: Sony Group Corporation, Tokyo (JP)

(72) Inventors: Eiji Hirata, Kanagawa (JP); Shun Kaizu, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 23 days.

(21) Appl. No.: 18/699,436

(22) PCT Filed: Oct. 31, 2022

(86) PCT No.: PCT/JP2022/040594
§ 371 (c)(1),
(2) Date: Apr. 8, 2024

(87) PCT Pub. No.: WO2023/085138
PCT Pub. Date: May 19, 2023

(65) Prior Publication Data
US 2025/0240546 A1    Jul. 24, 2025

(30) Foreign Application Priority Data
Nov. 12, 2021   (JP) .................................. 2021-185078

(51) Int. Cl.
*H04N 25/771*   (2023.01)
*H04N 25/616*   (2023.01)
(Continued)

(52) U.S. Cl.
CPC ......... *H04N 25/771* (2023.01); *H04N 25/616* (2023.01); *H04N 25/708* (2023.01); *H04N 25/779* (2023.01); *H04N 25/78* (2023.01)

(58) Field of Classification Search
CPC .. H04N 25/771; H04N 25/616; H04N 25/708; H04N 25/779; H04N 25/78; H04N 25/77; H04N 25/778
See application file for complete search history.

(56) References Cited

U.S. PATENT DOCUMENTS 9,257,468 B2 *  2/2016  Gomi ...................... H04N 25/78
11,317,042 B2 *  4/2022  Tang ....................... H04N 25/42
(Continued)

FOREIGN PATENT DOCUMENTS

WO   WO 2015/019836 A1   2/2015
WO   WO 2021/006048 A1   1/2021
(Continued)

OTHER PUBLICATIONS

Canny, A Computational Approach to Edge Detection, IEEE Transactions on Pattern Analysis and Machine Intelligence, Nov. 1986, pp. 679-698, vol. PAMI-8, No. 6.
(Continued)

*Primary Examiner* — Nicholas G Giles
(74) *Attorney, Agent, or Firm* — Paratus Law Group, PLLC

(57) ABSTRACT

There is provided a solid-state imaging device, a method for driving the solid-state imaging device, and an electronic device that enable a solid-state imaging device capable of outputting a spatial difference to be realized at low cost. The solid-state imaging device includes: a pixel including a photoelectric conversion element, a first capacitive element, and a second capacitive element; a reading circuit shared by a plurality of the pixels including a first pixel and a second
(Continued)

pixel; and a vertical scanning circuit configured to control the pixel and the reading circuit, in which the vertical scanning circuit performs first control of simultaneously reading signal levels of different capacitive elements of the first and second capacitive elements in the first pixel and the second pixel. The present disclosure can be applied to, for example, a solid-state imaging device or the like in which a pair of capacitors is provided for each pixel, and these capacitors hold two signals of a reset level and a signal level to be subjected to AD conversion.

20 Claims, 22 Drawing Sheets

(51) Int. Cl.
*H04N 25/708* (2023.01)
*H04N 25/779* (2023.01)
*H04N 25/78* (2023.01)

(56) References Cited

U.S. PATENT DOCUMENTS

| | | | |
|---|---|---|---|
| 11,387,267 B2* | 7/2022 | Nakanishi | H04N 23/60 |
| 2013/0321683 A1 | 12/2013 | Sonoda | |
| 2014/0139713 A1* | 5/2014 | Gomi | H04N 25/65 348/308 |
| 2021/0104562 A1* | 4/2021 | Nakanishi | G02B 7/34 |
| 2022/0070395 A1* | 3/2022 | Tang | H04N 25/616 |

FOREIGN PATENT DOCUMENTS

| | | |
|---|---|---|
| WO | WO 2021/215105 A1 | 10/2021 |
| WO | WO-2021215093 A1 | 10/2021 |

OTHER PUBLICATIONS

Young et al., A Data-Compressive 1.5b/2.75b Log-Gradient QVGA Image Sensor with Multi-Scale Readout for Always-On Object Detection, 2019 IEEE International Solid-State Circuits Conference Digest of Technical Papers, Feb. 2019, pp. 98 and 99, Session 5 / Image Sensors, 5.3.

Nazeri et al., Edge-Informed Single Image Super-Resolution, Proceedings of the IEEE/CVF International Conference on Computer Vision (ICCV), 2019, pp. 1-10.

Kobayashi et al., A 1.8e-$_{rms}$ Temporal Noise Over 110dB Dynamic Range 3.4 µm Pixel Pitch Global Shutter CMOS Image Sensor with Dual-Gain Amplifiers, SS-ADC and Multiple-Accumulation Shutter, 2017 IEEE International Solid-State Circuits Conference Digest of Technical Papers, Feb. 2017, pp. 74 and 75, Session 4 / Imagers, 4.5.

* cited by examiner

SOLID-STATE IMAGING DEVICE, METHOD FOR DRIVING THE SAME, AND ELECTRONIC DEVICE FOR SIMULTANEOUSLY READING SIGNAL LEVELS OF DIFFERENT CAPACITIVE ELEMENTS

CROSS REFERENCE TO PRIOR APPLICATION

This application is a National Stage Patent Application of PCT International Patent Application No. PCT/JP2022/040594 (filed on Oct. 31, 2022) under 35 U.S.C. § 371, which claims priority to Japanese Patent Application No. 2021-185078 (filed on Nov. 12, 2021), which are all hereby incorporated by reference in their entirety.

TECHNICAL FIELD

The present disclosure relates to a solid-state imaging device, a method for driving the solid-state imaging device, and an electronic device, and more particularly, to a solid-state imaging device, a method for driving the solid-state imaging device, and an electronic device that enable a solid-state imaging device capable of outputting a spatial difference to be realized at low cost.

BACKGROUND ART

In an image sensor having a global shutter function, a solid-state imaging device has been proposed in which a pair of capacitors is provided for each pixel, and these capacitors hold two signals of a reset level and a signal level to be subjected to AD conversion (see, for example, Patent Document 1).

In an image sensor having a global shutter function, a shared pixel structure in which a pixel transistor for reading a signal from a pixel is shared by a plurality of pixels is known (see, for example, Non-Patent Document 1).

Meanwhile, signal processing for obtaining a spatial difference of an image is used in various image processing. For example, the spatial difference of the image is also used for edge detection (see, for example, Non-Patent Document 2) by the Canny method, a Sobel filter, and the like. Processing of detecting phase difference information of a pixel for focus control is also one of signal processing for obtaining a spatial difference because a difference between pixels is calculated.

The signal processing of the spatial difference of the image is often performed by a signal processing chip or the like at the subsequent stage of the image sensor, but it has also been proposed that signal processing is performed inside the image sensor (see, for example, Non-Patent Document 3). Non-Patent Document 3 also discloses an application example in which object recognition is performed by combining a spatial difference image and machine learning. The processing combining the spatial difference image and the machine learning includes super-resolution processing of restoring a high-resolution luminance image from a high-resolution spatial difference image and a low-resolution luminance image (see, for example, Non-Patent Document 4).

CITATION LIST

Patent Document

Patent Document 1: WO 2021/215105

Non-Patent Document

Non-Patent Document 1: Masahiro Kobayashi, et al., "A 1.8erms Temporal Noise Over 110 dB Dynamic Range 3.4 µm Pixel Pitch Global Shutter CMOS Image Sensor with Dual-Gain Amplifiers, SS-ADC and Multiple-Accumulation Shutter" ISSCC Dig. Tech. Papers, pp. 74-75, February 2017

Non-Patent Document 2: Canny, J., A Computational Approach To Edge Detection, IEEE Transactions on Pattern Analysis and Machine Intelligence, 8(6): 679-698, 1986, Internet <URL: https://ieeexplore.ieee.org/document/4767851>

Non-Patent Document 3: Christopher Young, et al., "A Data-Compressive 1.5b/2.75b Log-Gradient QVGA Image Sensor with Multi-Scale Readout for Always-On Object Detection," ISSCC Dig. Tech. Papers, pp. 98-99, February 2019

Non-Patent Document 4: Kamyar Nazeri, Harrish Thasarathan, Mehran Ebrahimi, "Edge-Informed Single Image Super-Resolution", Proceedings of the IEEE/CVF International Conference on Computer Vision (ICCV), 2019, Internet <URL: https://openaccess.thecvf.com/content_ICCVW_2019/html/AIM/Nazeri_Edge-Informed_Single_Image_Super-Resolution_ICCVW_2019_paper.html>

SUMMARY OF THE INVENTION

Problems to be Solved by the Invention

In a case where a spatial difference of an image is obtained by signal processing in a subsequent stage of the image sensor, the image sensor performs two times of AD conversion of the reset level and the signal level for one signal. Therefore, in order to obtain a difference between the two signals, AD conversion noise is applied four times in total, and an SN ratio deteriorates. In a case where the spatial difference is calculated at the subsequent stage of the image sensor, there is a concern about a processing delay and an increase in power consumption associated with the calculation.

On the other hand, in a case where the spatial difference is calculated inside the image sensor, an additional component such as a buffer circuit for the spatial difference calculation is required, and there is a concern about an increase in chip cost and an increase in power consumption.

The present disclosure has been made in view of such a situation, and an object thereof is to enable a solid-state imaging device capable of outputting spatial difference to be realized at low cost.

Solutions to Problems

A solid-state imaging device of a first aspect of the present disclosure includes:
  a pixel including
    a photoelectric conversion element,
    a first capacitive element configured to hold a first signal level of the photoelectric conversion element, and
    a second capacitive element configured to hold a second signal level of the photoelectric conversion element;
  a reading circuit shared by a plurality of the pixels including a first pixel and a second pixel; and a vertical scanning circuit configured to control the pixel and the reading circuit, in which the vertical scanning circuit performs first control of simultaneously reading signal levels of different capacitive elements of the first and second capacitive elements in the first pixel and the second pixel.

A method for driving a solid-state imaging device of a second aspect of the present disclosure includes by the solid-state imaging device including:
a pixel including
a photoelectric conversion element,
a first capacitive element configured to hold a first signal level of the photoelectric conversion element, and
a second capacitive element configured to hold a second signal level of the photoelectric conversion element; and
a reading circuit shared by a plurality of the pixels including a first pixel and a second pixel,
performing first control of simultaneously reading signal levels of different capacitive elements of the first and second capacitive elements in the first pixel and the second pixel.

An electronic device of a third aspect of the present disclosure includes a solid-state imaging device, the solid-state imaging device including:
a pixel including
a photoelectric conversion element,
a first capacitive element configured to hold a first signal level of the photoelectric conversion element, and
a second capacitive element configured to hold a second signal level of the photoelectric conversion element;
a reading circuit shared by a plurality of the pixels including a first pixel and a second pixel; and
a vertical scanning circuit configured to control the pixel and the reading circuit, in which
the vertical scanning circuit performs first control of simultaneously reading signal levels of different capacitive elements of the first and second capacitive elements in the first pixel and the second pixel.

In the first to third aspects of the present disclosure, first control of simultaneously reading signal levels of different capacitive elements of the first and second capacitive elements in the first pixel and the second pixel is performed in a solid-state imaging device including: a pixel including a photoelectric conversion element, a first capacitive element configured to hold a first signal level of the photoelectric conversion element, and a second capacitive element configured to hold a second signal level of the photoelectric conversion element; and a reading circuit shared by a plurality of the pixels including a first pixel and a second pixel.

The solid-state imaging device or the electronic device may be an independent device or a module incorporated in another device.

MODE FOR CARRYING OUT THE INVENTION

Figure 1:
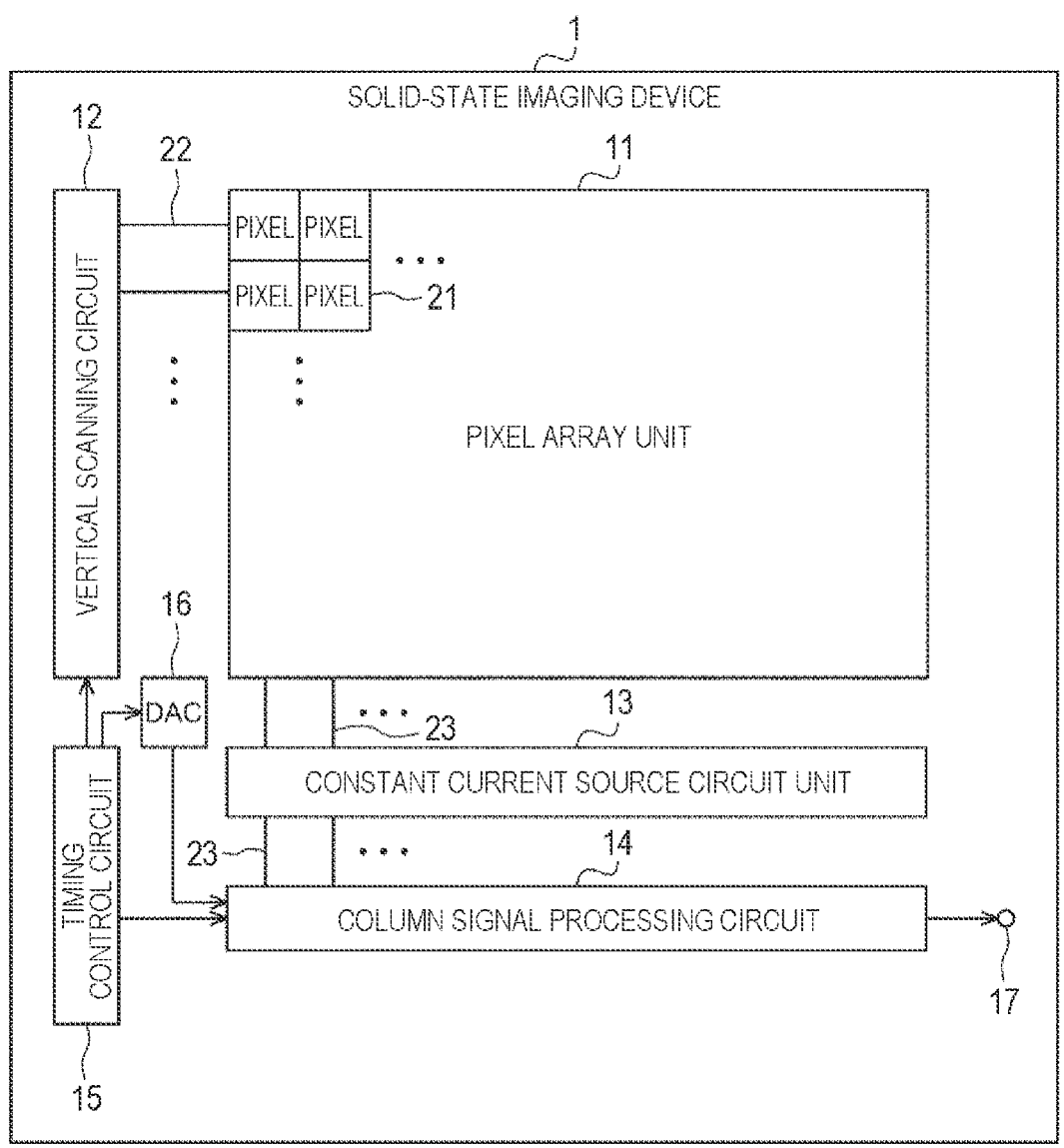
FIG. 1 is a block diagram illustrating a configuration example of a first embodiment of a solid-state imaging device according to the present disclosure.

Hereinafter, modes for carrying out the technique of the present disclosure (hereinafter, it is referred to as embodiments) will be described with reference to the accompanying drawings. Note that, in the present specification and the drawings, components having substantially the same functional configurations are denoted by the same reference signs, and redundant descriptions are omitted. The description will be given in the following order.

1. Configuration example of first embodiment of solid-state imaging device
2. Pixel circuit configuration example of sharing unit 3. Configuration example of column signal processing circuit
4. Pixel signal output operation in units of one pixel
5. Output operation of differential pixel signal
6. Variations of pixel differences
7. Another configuration examples of column signal processing circuit
8. Hybrid of spatial difference output and single pixel luminance output
9. Moving object detection processing
10. Configuration example of second embodiment of solid-state imaging device
11. First image processing example of second embodiment
12. Second image processing example of second embodiment
13. Application example to electronic device

1. Configuration Example of First Embodiment of Solid-State Imaging Device

FIG. 1 is a block diagram illustrating a configuration example of a first embodiment of a solid-state imaging device according to the present disclosure.

A solid-state imaging device 1 in FIG. 1 includes a pixel array unit 11, a vertical scanning circuit 12, a constant current source circuit unit 13, a column signal processing circuit 14, a timing control circuit 15, a digital to analog converter (DAC) 16, and an output unit 17. The solid-state imaging device 1 is formed on, for example, a single semiconductor chip.

In the pixel array unit 11, pixels 21 having photoelectric conversion elements that generate and accumulate photocharges according to the amount of received light are two-dimensionally arranged in a matrix in the row direction and the column direction. Here, the row direction refers to the arrangement direction of the pixel array unit 11 in the horizontal direction, and the column direction refers to the arrangement direction of the pixel array unit 11 in the vertical direction.

The pixel drive line 22 is wired along the horizontal direction for each row and the vertical signal line 23 is wired along the vertical direction for each column with respect to the pixel array in the matrix of the pixel array unit 11. The pixel drive line 22 is a wiring that transmits a drive signal for performing driving when a pixel signal VSL is read from the pixel 21. Note that in FIG. 1, the pixel drive line 22 is illustrated as one wire but is not limited to one. One end of the pixel drive line 22 is connected to an output end corresponding to each pixel row of the vertical scanning circuit 12.

The vertical scanning circuit 12 includes a shift register, an address decoder, and the like, and drives each pixel 21 of the pixel array unit 11 at the same time for all pixels or in units of rows. That is, the vertical scanning circuit 12 controls start and end of light reception (exposure) of each pixel 21 of the pixel array unit 11 and reading of signal charges accumulated in the photoelectric conversion element. By the drive signal transmitted from the vertical scanning circuit 12 via the pixel drive line 22, the signal charge generated in each pixel 21 is output to the vertical signal line 23 as the pixel signal VSL and transmitted to the column signal processing circuit 14.

The constant current source circuit unit 13 includes a current source 81 (FIG. 3) corresponding to a plurality of pixels in the column direction of the pixel array unit 11, and supplies a constant current to each pixel 21 arranged in the same column.

The column signal processing circuit 14 performs AD conversion processing or correlated double sampling (CDS) on the pixel signal VSL supplied from one or more pixels 21 of the pixel array unit 11 via the vertical signal line 23. The column signal processing circuit 14 outputs the pixel data subjected to the AD conversion processing and the CDS processing to the outside via the output unit 17.

The timing control circuit 15 supplies a clock signal and a timing signal necessary for a predetermined operation to the vertical scanning circuit 12, the DAC 16, and the column signal processing circuit 14 on the basis of a master clock of a predetermined frequency. For example, the timing control circuit 15 supplies a timing signal of a light receiving operation or a reading operation of the pixel 21 to the vertical scanning circuit 12, the DAC 16, and the column signal processing circuit 14.

In accordance with the clock signal from the timing control circuit 15, the DAC 16 generates, as a reference signal, a ramp signal Ramp whose level (voltage) changes in an inclined manner as time elapses, and supplies the ramp signal Ramp to the column signal processing circuit 14.

The output unit 17 shapes the pixel data supplied from the column signal processing circuit 14 into a predetermined format and outputs the data to an external device.

Each pixel 21 of the solid-state imaging device 1 having the above configuration can perform, for example, a global shutter type operation (imaging) in which the exposure time is set to be the same in all the pixels of the pixel array unit 11, charges are temporarily held after the exposure ends, and the charges are sequentially read in units of rows.

Each pixel 21 of the pixel array unit 11 has a shared pixel structure in which a plurality of adjacent pixels shares a pixel transistor for reading the pixel signal VSL.

2. Pixel Circuit Configuration Example of Sharing Unit

Figure 2:
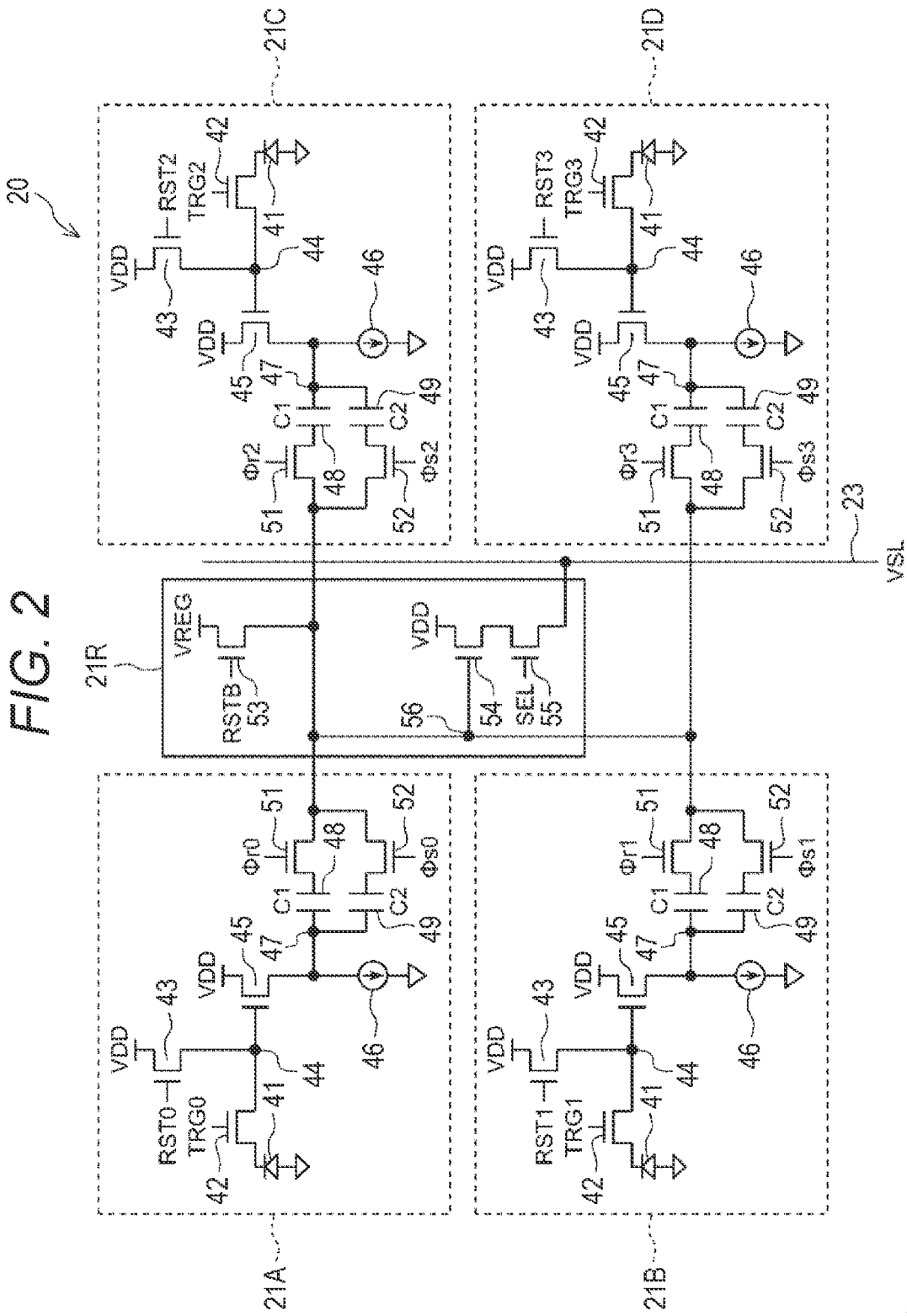
FIG. 2 is a diagram illustrating a circuit configuration example of a plurality of pixels constituting one sharing unit in a pixel array unit.

FIG. 2 illustrates a circuit configuration example of a plurality of pixels constituting one sharing unit in the pixel array unit 11.

The sharing unit 20 in FIG. 2 includes four pixels of two pixels in the row direction and two pixels (2×2) in the column direction.

In FIG. 2, in order to distinguish the four pixels 21 constituting the sharing unit 20, reference numerals of pixels 21A to 21D are assigned. In the following description, in a case where it is not necessary to particularly distinguish the pixels 21A to 21D, they will be simply referred to as the pixel 21.

The pixels 21A and 21C are arranged in the same row in the pixel array unit 11, and the pixels 21B and 21D are arranged in the same row adjacent to the pixels 21A and 21C. Furthermore, the pixels 21A and 21B are arranged in the same column in the pixel array unit 11, and the pixels 21C and 21D are arranged in the same column adjacent to the pixels 21A and 21B.

Note that the sharing unit 20 is not limited to four pixels of 2×2, and may be a plurality of other pixels. For example, the sharing unit 20 may include nine pixels including 3 pixels in the row direction and 3 pixels (3×3) in the column direction. Furthermore, the sharing unit 20 does not need to include a plurality of pixels in each of the row direction and the column direction, and for example, a plurality of pixels arranged only in the column direction or the row direction may be included in the sharing unit 20. However, as described later, in consideration of edge detection performance of an image, it is desirable that a plurality of pixels is included in each of the row direction and the column direction.

Each pixel 21 constituting the sharing unit 20 includes a photoelectric conversion element 41, a transfer transistor 42, a reset transistor 43, a floating diffusion (FD) 44, an amplification transistor 45, a current source transistor 46, capacitive elements 48 and 49, and selection transistors 51 and 52.

Furthermore, the sharing unit 20 includes a reading circuit 21R shared by the pixels 21A to 21D, and the reading circuit 21R includes a sharing reset transistor 53, a sharing amplification transistor 54, and a sharing selection transistor 55.

The photoelectric conversion element 41 includes, for example, a photodiode, and generates and accumulates a charge (signal charge) corresponding to the amount of received light. When turned on by a transfer signal TRG from the vertical scanning circuit 12, the transfer transistor 42 transfers the charge generated by the photoelectric conversion element 41 to the FD 44.

When turned on by an FD reset signal RST from the vertical scanning circuit 12, the reset transistor 43 resets the potential of the FD 44 by discharging the charge accumulated in the FD 44 to the drain (power supply potential VDD). The FD 44 accumulates the charge transferred from the photoelectric conversion element 41 and generates a voltage corresponding to the charge amount.

The amplification transistor 45 configures a source follower circuit with the current source transistor 46, amplifies the voltage level of the FD 44, and outputs the amplified voltage level to a node 47 (hereinafter, it is referred to as a capacitive input node 47). The drain of the amplification transistor 45 is connected to the power supply potential VDD. The current source transistor 46 supplies a constant current under the control of the vertical scanning circuit 12. The current supplied by the current source transistor 46 is on the order of several nanoamperes (nA) to several tens of nanoamperes (nA) in order to suppress IR drop.

One end of each of the capacitive elements 48 and 49 is commonly connected to the capacitive input node 47. The other end of the capacitive element 48 is connected to the selection transistor 51, and the other end of the capacitive element 49 is connected to the selection transistor 52. The capacitive elements 48 and 49 hold a predetermined voltage level output from the amplification transistor 45. The storage capacitance of the capacitive element 48 is denoted by C1, and the storage capacitance of the capacitive element 49 is denoted by C2.

The selection transistor 51 selects the capacitive element 48 and is connected to the subsequent stage, and the selection transistor 52 selects the capacitive element 49 and is connected to the subsequent stage. More specifically, when turned on by a selection signal Φr from the vertical scanning circuit 12, the selection transistor 51 connects the capacitive element 48 and the node 56 (hereinafter, it is referred to as a sharing amplification transistor node 56). When turned on by a selection signal Φs from the vertical scanning circuit 12, the selection transistor 52 connects the capacitive element 49 and the sharing amplification transistor node 56.

The sharing reset transistor 53 initializes the level of the sharing amplification transistor node 56 to a predetermined potential VREG when turned on by a sharing reset signal RSTB from the vertical scanning circuit 12. A potential (for example, a potential lower than the power supply potential VDD) different from the power supply potential VDD is set as the potential VREG.

The sharing amplification transistor 54 amplifies the voltage level supplied to the sharing amplification transistor node 56 and outputs the amplified voltage level to the vertical signal line 23 via the sharing selection transistor 55. When turned on by a sharing selection signal SEL from the vertical scanning circuit 12, the sharing selection transistor 55 outputs a signal of the voltage level amplified by the sharing amplification transistor 54 to the vertical signal line 23 as the pixel signal VSL.

Note that, for example, an N-type metal oxide semiconductor (MOS) transistor can be used for various pixel transistors in the sharing unit 20. In this case, when the pixel transistor is turned on by the drive signal supplied to the gate, it is in a closed state in which the drain and the source are connected.

In FIG. 2, the transfer signal TRG, the FD reset signal RST, the selection signal Φr, and the selection signal Φs supplied from the vertical scanning circuit 12 to the pixels 21A to 21D, respectively, are distinguished, and "0" to "3" are attached to the signals to the pixels 21A to 21D, respectively. For example, the transfer signal TRG, the FD reset signal RST, the selection signal Φr, and the selection signal Φs supplied to the pixel 21A are described as a transfer signal TRG0, an FD reset signal RST0, a selection signal Φr0, and a selection signal Φs0, respectively, and the transfer signal TRG, the FD reset signal RST, the selection signal Φr, and the selection signal Φs supplied to the pixel 21B are described as a transfer signal TRG1, an FD reset signal RST1, a selection signal Φr1, and a selection signal Φs1, respectively. Similarly, "2" is attached to each signal supplied to the pixel 21C, and "3" is attached to each signal supplied to the pixel 21D.

Although the operation of the pixel 21 will be described later with reference to FIGS. 4 to 6, a potential Vrst corresponding to the reset level of the pixel 21 is held in the capacitive element 48 of the pixel 21, a potential Vsig corresponding to the signal level of the pixel 21 is held in the capacitive element 49, and a signal corresponding to these potentials is output as the pixel signal VSL to the column signal processing circuit 14 through the vertical signal line 23.

3. Configuration Example of Column Signal Processing Circuit

Figure 3:
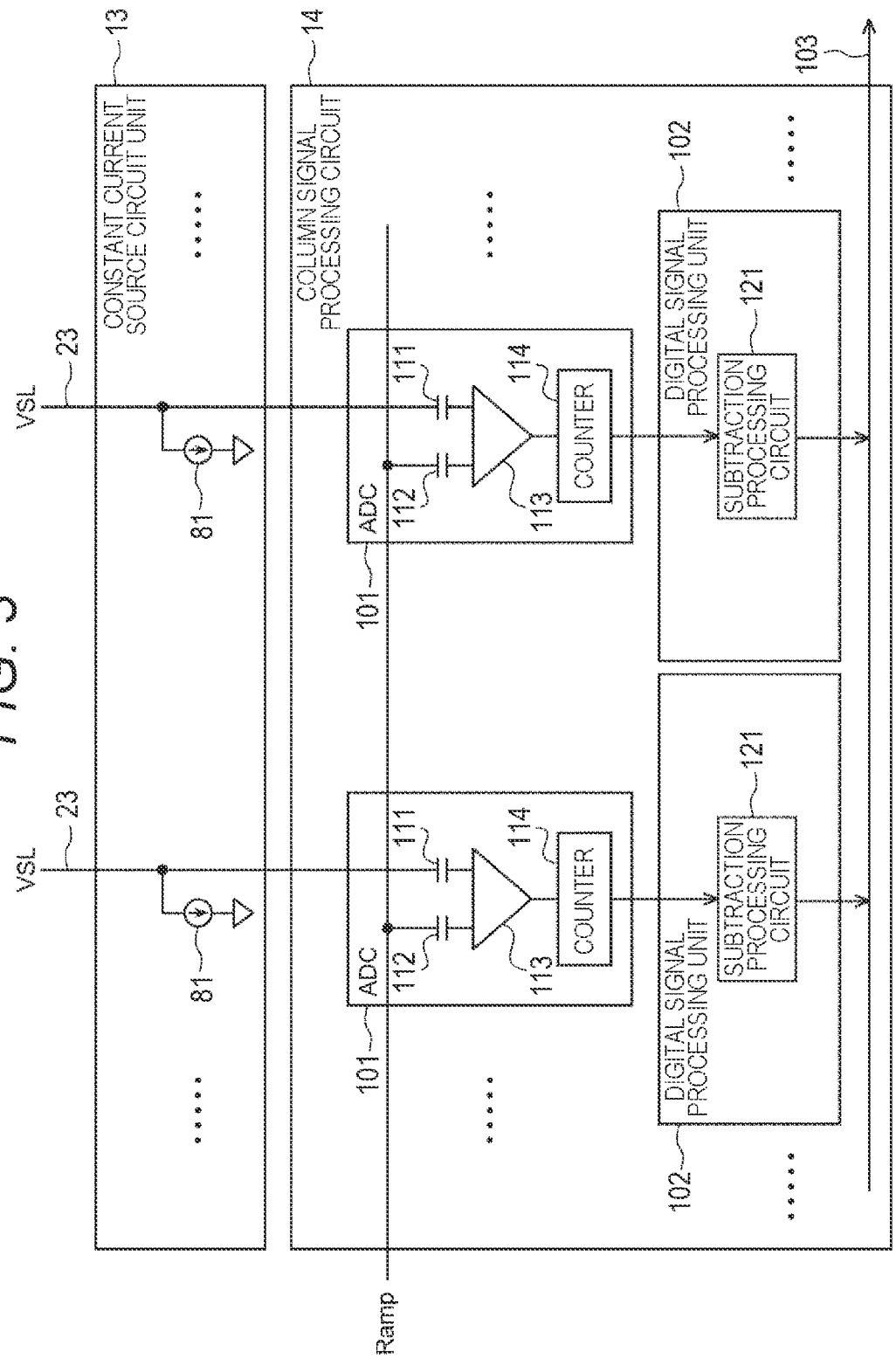
FIG. 3 is a block diagram illustrating a detailed configuration example of a constant current source circuit unit and a column signal processing circuit.

FIG. 3 is a block diagram illustrating a detailed configuration example of the constant current source circuit unit 13 and the column signal processing circuit 14.

The constant current source circuit unit 13 includes a plurality of current sources 81, and the current source 81 includes, for example, a load MOS transistor. As described with reference to FIG. 2, in a case where two pixels arranged in the row direction are the sharing unit 20 and are connected to one vertical signal line 23, the current sources 81 are provided in units of two columns of the pixel array unit 11. The current source 81 configures a source follower circuit with the sharing amplification transistor 54 connected to the same vertical signal line 23.

The column signal processing circuit 14 includes a plurality of ADCs 101 and a plurality of digital signal processing units 102. The ADC 101 and the digital signal processing unit 102 are provided for each vertical signal line 23. That is, assuming that the number of the vertical signal lines 23 is I, the number of the ADCs 101 and the digital signal processing units 102 included in the column signal processing circuit 14 is I.

The ADC 101 includes capacitive elements (capacitors) 111 and 112, a comparator 113, and a counter 114, and converts an analog signal input via the vertical signal line 23 into a digital count value (AD conversion). The digital signal processing unit 102 includes a subtraction processing circuit 121 that subtracts the two AD-converted count values.

The pixel signal VSL output from the pixel 21 is input to the capacitive element 111 of the ADC 101 via the vertical signal line 23. On the other hand, a ramp signal Ramp whose level (voltage) changes in an inclined manner with the lapse of time from the DAC 16 (FIG. 1) is input to the capacitive element 112 as a reference signal.

Note that the capacitive elements 111 and 112 are for removing the DC components of the ramp signal Ramp and the pixel signal VSL so that the comparator 113 can compare only the AC components of the ramp signal and the pixel signal.

The comparator 113 outputs a difference signal obtained by comparing the pixel signal VSL with the ramp signal Ramp to the counter 114. For example, in a case where the ramp signal Ramp is larger than the pixel signal VSL, a Hi (High) difference signal is supplied to the counter 114, and in a case where the ramp signal Ramp is smaller than the pixel signal VSL, a Lo (Low) difference signal is supplied to the counter 114.

The counter 114 counts only while the Hi difference signal is supplied in a first AD conversion period, and supplies a P-phase count value which is a count result to the subtraction processing circuit 121. In addition, the counter 114 counts only while the Hi difference signal is supplied in a second AD conversion period, and supplies a D-phase count value which is a count result to the subtraction processing circuit 121.

The subtraction processing circuit 121 performs CDS processing using the P-phase count value and the D-phase count value supplied from the counter 114. That is, the subtraction processing circuit 121 subtracts the P-phase count value from the D-phase count value, and supplies the result to the output unit 17 via the signal line 103 as pixel data.

4. Pixel Signal Output Operation in Units of One Pixel

A global shutter operation of each pixel 21 of the pixel array unit 11 will be described with reference to FIGS. 4 and 5.

Figure 4:
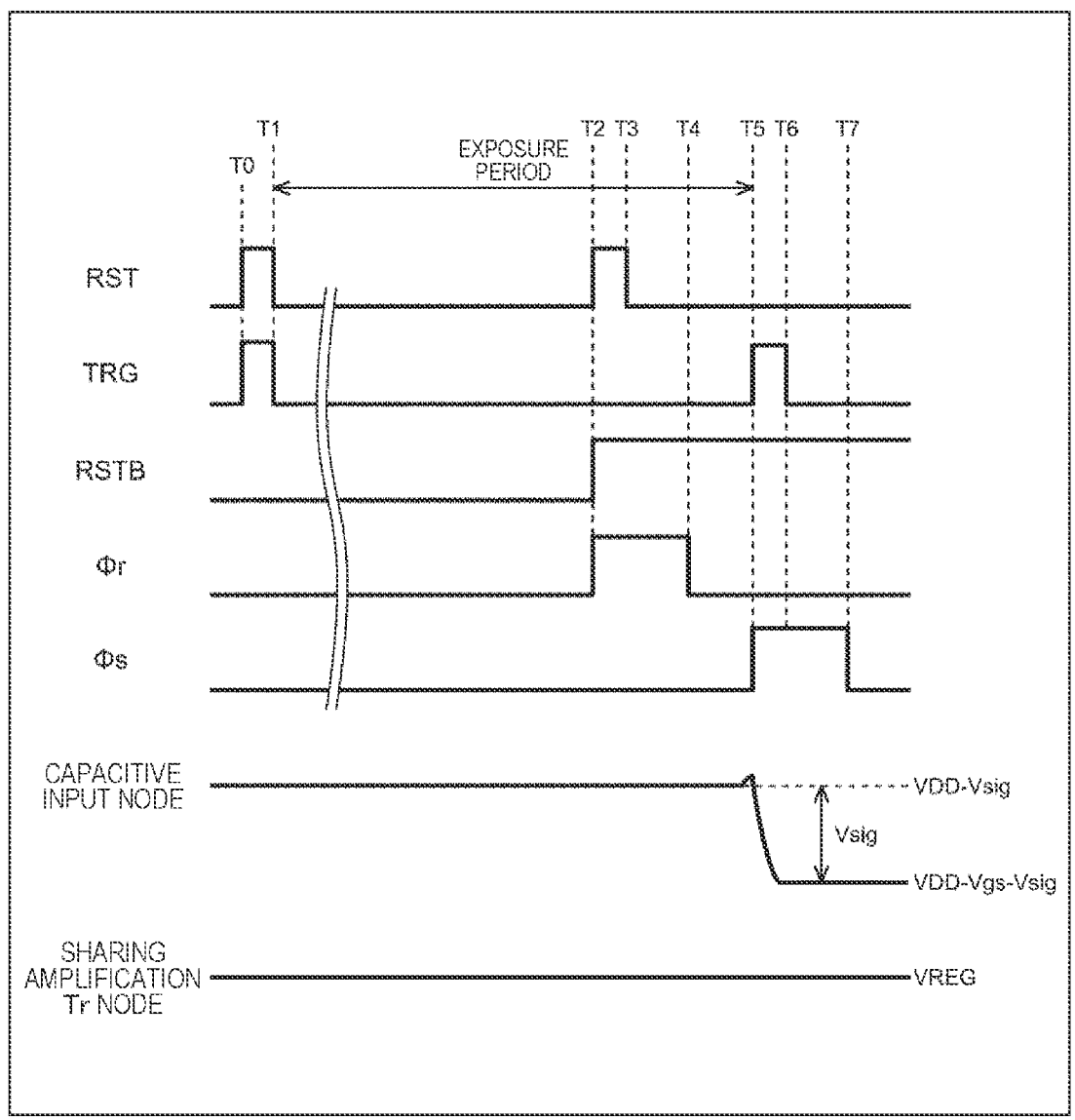
FIG. 4 is a timing chart for explaining an exposure operation of each pixel.

FIG. 4 illustrates a timing chart when each pixel 21 of the pixel array unit 11 performs an exposure operation. This exposure operation is simultaneously executed in all the pixels of the pixel array unit 11.

First, at time T0, the vertical scanning circuit 12 controls the FD reset signal RST and the transfer signal TRG to the Hi level and supplies the same to each pixel 21 of the pixel array unit 11. Therefore, the photoelectric conversion element 41 is initialized. Hereinafter, this control is referred to as "PD reset".

At time T1, the FD reset signal RST and the transfer signal TRG are controlled to the Lo level, so that exposure is started in each pixel 21 of the pixel array unit 11.

At time T2 immediately before the end of the exposure period, the vertical scanning circuit 12 controls the sharing reset signal RSTB and the selection signal Φr to the Hi level in all the pixels, and controls the FD reset signal RST to the Hi level in the period from time T2 to time T3. As a result, the FD 44 is initialized, and the voltage level corresponding to the voltage level of the FD 44 at that time is held in the capacitive element 48. This control is hereinafter referred to as "FD reset". The voltage level held in the capacitive element 48 corresponds to the reset level of the pixel 21.

At time T4 after time T3, the selection signal Φr is returned to the Lo level, but the sharing reset signal RSTB remains at the Hi level.

At time T5, which is the end timing of the exposure period, the vertical scanning circuit 12 controls the selection signal Φs to the Hi level in all the pixels, and controls the transfer signal TRG to the Hi level in the period from time T5 to time T6. As a result, the signal charge corresponding to the exposure amount is transferred to the FD 44, and the voltage level corresponding to the voltage level of the FD 44 at that time is held in the capacitive element 49. The voltage level held in the capacitive element 49 corresponds to the signal level of the pixel 21.

The voltage level of the capacitive input node 47 decreases from the reset level (VDD-Vsig) to the signal level (VDD-Vgs-Vsig). Here, VDD is a power supply voltage, and Vsig is a net signal level obtained by the CDS processing. Vgs is a gate-source voltage of the amplification transistor 45.

At time T7 after time T6, the selection signal @s is controlled to the Lo level.

The vertical scanning circuit 12 controls the current source transistors 46 of all the pixels to supply a predetermined current in the period from time T0 to time T7. On the other hand, each current source 81 of the constant current source circuit unit 13 is turned off, and no current flows through the current source 81.

Figure 5:
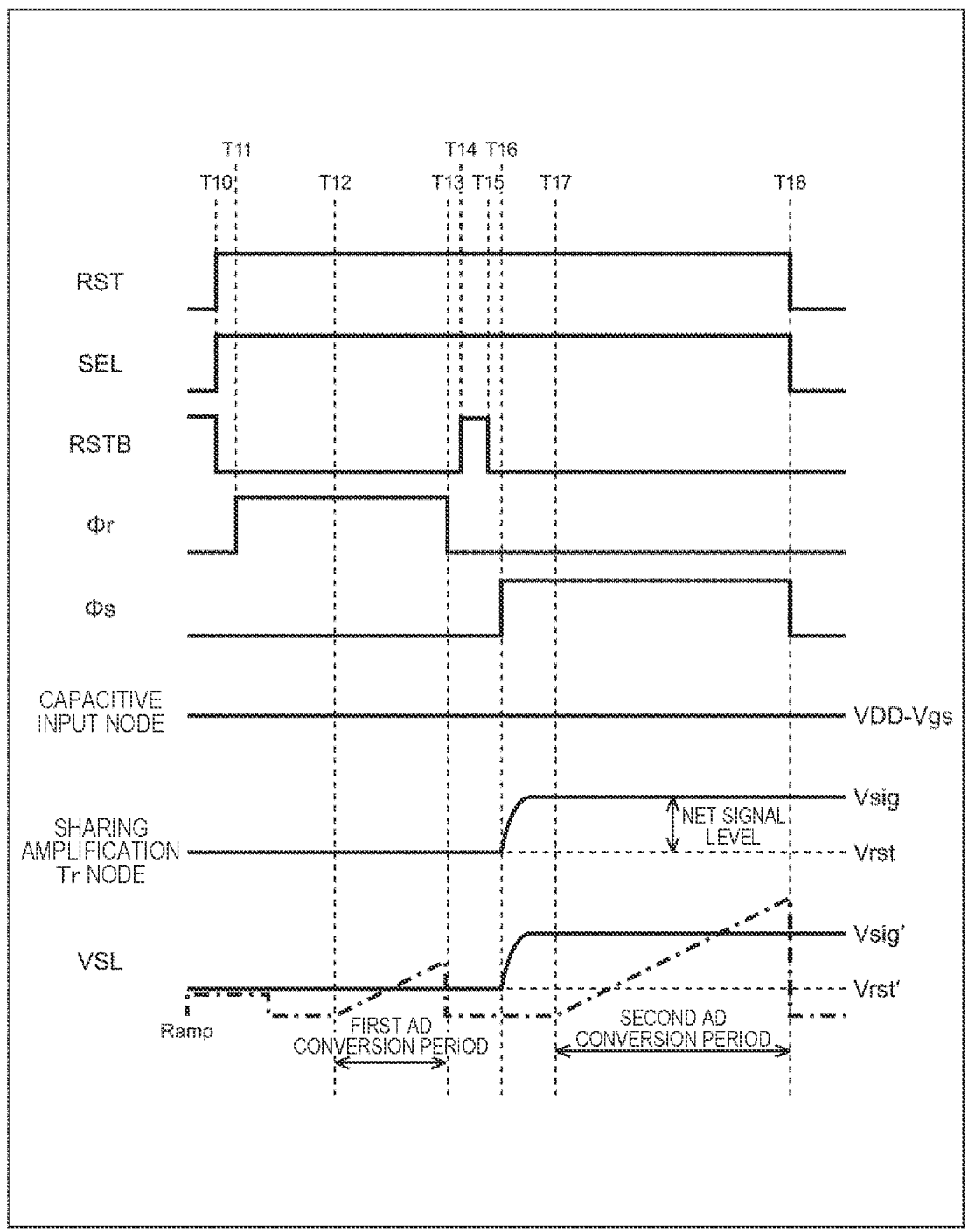
FIG. 5 is a timing chart illustrating a reading operation of a pixel signal of each pixel.

FIG. 5 illustrates a timing chart when each pixel 21 of the pixel array unit 11 performs a reading operation of the pixel signal VSL.

This reading operation is sequentially executed in a predetermined order for the plurality of pixels 21 constituting the sharing unit 20, but in FIG. 5, a predetermined one pixel in the sharing unit 20 is set as a read target pixel, and a reading operation of the pixel will be described.

First, the vertical scanning circuit 12 controls the sharing reset signal RSTB of all the rows to the Lo level at first time T10 of the reading period. Then, the vertical scanning circuit 12 controls the FD reset signal RST and the sharing selection signal SEL to the Hi level in the period from time T10 to time T17 which is a reading period.

Next, the vertical scanning circuit 12 controls the selection signal Φr of the reading target pixel to the Hi level in the period from time T11 to time T13 after time T10, and turns on the selection transistor 51. As a result, the potential of the sharing amplification transistor node 56 becomes the reset level Vrst, and the potential of the pixel signal VSL output to the vertical signal line 23 becomes a reset level Vrst' corresponding to the reset level Vrst.

The DAC 16 gradually increases the level of the ramp signal Ramp supplied to the ADC 101 in the first AD conversion period from time T12 to time T13 after time T11. The ADC 101 compares the ramp signal Ramp with the reset level Vrst' of the pixel signal VSL, and continues counting until the comparison result is inverted. As a result, the P-phase count value, which is the count value corresponding to the reset level Vrst', is read.

Next, the vertical scanning circuit 12 controls the sharing reset signal RSTB to the Hi level in the period from time T14 to time T15 after time T13. As a result, when the parasitic capacitance exists in the sharing amplification transistor node 56, the history of the previous signal held in the parasitic capacitance can be erased.

During the period from time T16 to time T18 after initialization of the sharing amplification transistor node 56, the vertical scanning circuit 12 controls the selection signal ϕs to the Hi level. As a result, the potential of the sharing amplification transistor node 56 becomes the signal level Vsig, and the potential of the pixel signal VSL output to the vertical signal line 23 becomes a signal level Vsig' corresponding to the signal level Vsig. At the time of exposure, the signal level is lower than the reset level, but at the time of reading, since the sharing amplification transistor node 56 is used as a reference, the signal level is higher than the reset level. The difference between the reset level Vrst' and the signal level Vsig' corresponds to the net signal level from which the reset noise and the offset noise of the FD 44 are removed.

The DAC 16 gradually increases the level of the ramp signal Ramp supplied to the ADC 101 in the second AD conversion period from time T17 to time T18 after time T16. The ADC 101 compares the ramp signal Ramp with the signal level Vsig' of the pixel signal VSL of the vertical signal line 23, and continues counting until the comparison result is inverted. As a result, the D-phase count value which is the count value corresponding to the signal level Vsig' is read.

The vertical scanning circuit 12 controls the current source transistor 46 of the reading target pixel to supply a predetermined current in the period from time T10 to time T18. In addition, each current source 81 of the constant current source circuit unit 13 is also controlled to the on-state, and a constant current flows through the current source 81.

For the pixels 21A to 21D constituting the sharing unit 20, for example, the pixels 21A, 21B, 21C, and 21D are sequentially set as reading target pixels in this order, and the pixel signal VSL of each pixel 21 of the sharing unit 20 can be read by driving the above-described reading operation.

Furthermore, for example, as in the pixels 21A and 21B, by simultaneously setting two pixels as reading target pixels, it is also possible to read the pixel signal VSL obtained by adding the signals of the two pixels (pixel addition).

As described above, the solid-state imaging device 1 performs exposure control to simultaneously start and end exposure for all the pixels of the pixel array unit 11. By this exposure control, the reset level Vrst and the signal level Vsig are sequentially generated, the potential of the reset level Vrst is held in the capacitive element 48, and the potential of the signal level Vsig is held in the capacitive element 49.

Note that, in the control of FIG. 5 described above, the signal level Vsig is read after the reset level Vrst, but the order is not limited thereto. The reset level Vrst can also be read after the signal level Vsig. In this case, the vertical scanning circuit 12 controls the selection signal Φr to the Hi level after controlling the selection signal Φs to the Hi level. Furthermore, in this case, it is necessary to reverse the inclination of the slope of the ramp signal Ramp.

5. Output Operation of Differential Pixel Signal

Next, the reading operation of the pixel 21 in the case of outputting the difference between the pixel signals of the two pixels in the sharing unit 20 will be described.

Figure 6:
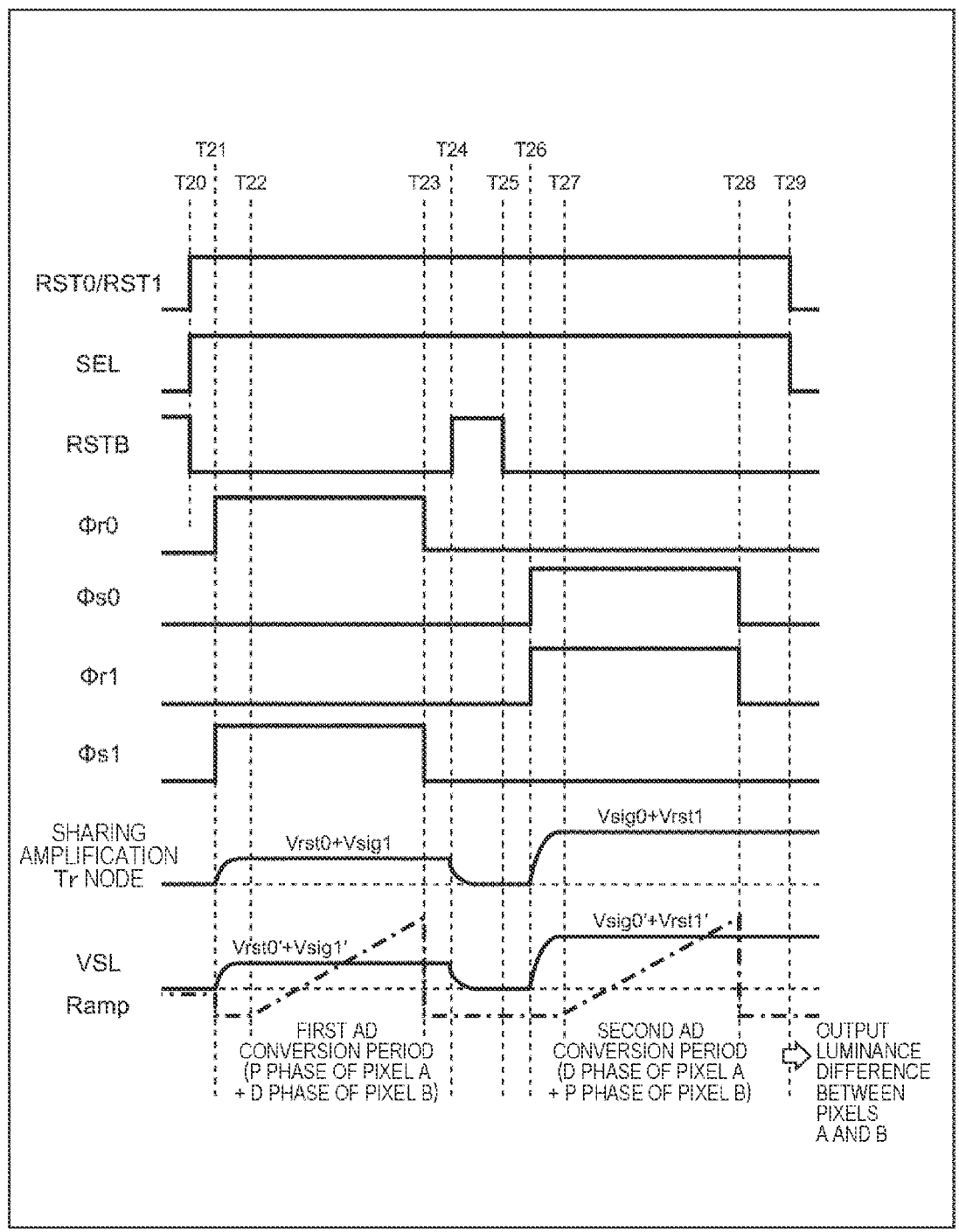
FIG. 6 is a timing chart for explaining a reading operation of pixel difference output.

FIG. 6 is a timing chart of the reading operation in the case of outputting the pixel difference between the pixel 21A and the pixel 21B arranged in the vertical direction (column direction) among the pixels 21A to 21D constituting the sharing unit 20.

Note that, since the exposure operation is similar to the driving described with reference to FIG. 4, the description thereof will be omitted.

First, the vertical scanning circuit 12 controls the sharing reset signal RSTB of all the rows to the Lo level at first time T20 of the reading period. Then, the vertical scanning circuit 12 controls the FD reset signals RST0 and RST1 of the pixels 21A and 21B which are reading target pixels in the sharing unit 20 and the sharing selection signal SEL to the Hi level in the period from time T20 to time T29 which is a reading period.

Next, during the period from time T21 to time T23 after time T20, the vertical scanning circuit 12 controls the selection signal Φr0 of the pixel 21A to the Hi level to turn on the selection transistor 51 of the pixel 21A, and controls the selection signal Φs1 of the pixel 21B to the Hi level to turn on the selection transistor 52 of the pixel 21B. As a result, a reset level Vrst0 of the pixel 21A and a signal level Vsig1 of the pixel 21B are simultaneously read, and the potential of the sharing amplification transistor node 56 becomes the sum (Vrst0+Vsig1) of the reset level Vrst0 of the pixel 21A and the signal level Vsig1 of the pixel 21B. Then, the potential of the pixel signal VSL output to the vertical signal line 23 becomes the sum (Vrst0'+Vsig1') of a reset level Vrst0' of the pixel 21A and a signal level Vsig1' of the pixel 21B.

The DAC 16 gradually increases the level of the ramp signal Ramp supplied to the ADC 101 in a first AD conversion period from time T22 to time T23 after time T21. The ADC 101 compares the ramp signal Ramp with the voltage level of the sum (Vrst0'+Vsig1') of the reset level Vrst0' of the pixel 21A and the signal level Vsig1' of the pixel 21B, and continues counting until the comparison result is inverted. As a result, the count value of the counter 114 becomes a value corresponding to the sum (pixel A_P+pixel B_D) of the P-phase count value of the pixel 21A and the D-phase count value of the pixel 21B.

Next, the vertical scanning circuit 12 controls the sharing reset signal RSTB to the Hi level in the period from time T24 to time T25 after time T23. As a result, when the parasitic capacitance exists in the sharing amplification transistor node 56, the history of the previous signal held in the parasitic capacitance can be erased.

During the period from time T26 to time T28 after initialization of the sharing amplification transistor node 56, the vertical scanning circuit 12 controls the selection signal Φs0 of the pixel 21A to the Hi level to turn on the selection transistor 52 of the pixel 21A, and controls the selection signal Φr1 of the pixel 21B to the Hi level to turn on the selection transistor 51 of the pixel 21B. As a result, a signal level Vsig0 of the pixel 21A and a reset level Vrst1 of the pixel 21B are simultaneously read, and the potential of the sharing amplification transistor node 56 becomes the sum (Vsig0+Vrst1) of the signal level Vsig0 of the pixel 21A and the reset level Vrst1 of the pixel 21B. Then, the potential of the pixel signal VSL output to the vertical signal line 23 becomes the sum (Vsig0'+Vrst1') of the signal level Vsig0' of the pixel 21A and the reset level Vrst1' of the pixel 21B.

The DAC 16 gradually increases the level of the ramp signal Ramp supplied to the ADC 101 in a second AD conversion period from time T27 to time T28 after time T26. The ADC 101 compares the ramp signal Ramp with the voltage level of the sum (Vsig0'+Vrst1') of the signal level Vsig0' of the pixel 21A and the reset level Vrst1' of the pixel 21B, and continues counting until the comparison result is inverted. As a result, the count value of the counter 114 becomes a value corresponding to the sum (pixel A_D+pixel B_P) of the D-phase count value of the pixel 21A and the P-phase count value of the pixel 21B.

The subtraction processing circuit 121 performs CDS processing by performing subtraction processing on the sum (pixel A_P+pixel B_D) of the P-phase count value of the pixel 21A and the D-phase count value of the pixel 21B, which is first supplied from the counter 114, and the sum (pixel A_D+pixel B_P) of the D-phase count value of the pixel 21A and the P-phase count value of the pixel 21B, which is supplied second time.

That is, the subtraction processing circuit 121 performs subtraction processing of Formula (1) below.

$$CDS \text{ processing} = (\text{pixel A\_P} + \text{pixel B\_D}) - (\text{pixel A\_D} + \text{pixel B\_P}) \quad (1)$$

Here, a case where the pixel difference between the pixel 21A and the pixel 21B is calculated after the pixel signals VSL of the pixel 21A and the pixel 21B are individually read by the driving described with reference to FIG. 5 will be considered.

The P-phase count value and the D-phase count value of each of the pixel 21A and the pixel 21B are read as follows.

$$\text{Pixel } 21A = \text{pixel A\_P} - \text{pixel A\_D}$$
$$\text{Pixel } 21B = \text{pixel B\_P} - \text{pixel B\_D}$$

The pixel difference between the pixel 21A and the pixel 21B is expressed by Formula (2) below.

$$\text{Pixel } 21A - \text{pixel } 21B = \quad (2)$$
$$(\text{pixel A\_P} - \text{pixel A\_D}) - (\text{pixel B\_P} - \text{pixel B\_D})$$

When Formula (2) is transformed, it can be expressed as Formula (3) below.

$$\text{Pixel } 21A - \text{pixel } 21B = (\text{pixel A\_P} - \text{pixel A\_D}) - \quad (3)$$
$$(\text{pixel B\_P} - \text{pixel B\_D})$$
$$= \text{Pixel A\_P} - \text{pixel A\_D} -$$
$$\text{pixel B\_P} + \text{pixel B\_D}$$
$$= \text{Pixel A\_P} + \text{pixel B\_D} -$$
$$\text{pixel A\_D} - \text{pixel B\_P}$$
$$= (\text{Pixel A\_P} + \text{pixel B\_D}) -$$
$$(\text{pixel A\_D} + \text{pixel B\_P})$$

Since Formula (3) is equal to Formula (1) described above, it can be seen that the pixel difference between the pixel 21A and the pixel 21B is obtained by the driving described in the flowchart of FIG. 5.

That is, the reset level Vrst0' of the pixel 21A, which is one of the two pixels (the pixel 21A and the pixel 21B) that output the pixel difference, and the signal level Vsig1' of the pixel 21B, which is the other, are simultaneously read, and then the signal level Vsig0' of the pixel 21A and the reset level Vrst1' of the pixel 21B are simultaneously read, so that the difference between the pixel signals of the two pixels can be obtained.

In a case where the pixel signals VSL of the pixel 21A and the pixel 21B are individually read and then the pixel difference between the pixel 21A and the pixel 21B is calculated in the digital signal processing unit 102 or the like at the subsequent stage, since the AD conversion processing is performed twice for acquiring the pixel data of one pixel, it is necessary to perform the AD conversion processing four times in total, and the influence of noise (reading noise) increases.

On the other hand, in the control of FIG. 6, since the pixel difference can be obtained by two times of AD conversion processing, noise can be reduced, and the SN ratio can be improved. Furthermore, the control of FIG. 6 can be executed in the same period as the reading period of one pixel described with reference to FIG. 5, and the difference calculation processing or the like in the subsequent block is unnecessary, so that the pixel difference can be obtained in a short period. Furthermore, for the control of the pixel 21, only the control of the selection signals Φs0 and Φr for controlling the selection transistors 51 and 52 of the pixel 21 is changed, and no additional circuit, wiring, or the like is required.

That is, according to the solid-state imaging device 1, pixel differential output can be realized with low noise, high speed, low power consumption, and low cost by the control of FIG. 6.

In the reading control of FIG. 6, when the pixel 21A is a first pixel, the pixel 21B is a second pixel, the capacitive element 48 holding the reset level Vrst is a first capacitive element, and the capacitive element 49 holding the signal level Vsig is a second capacitive element, potentials of different capacitive elements of the first and second capacitive elements are simultaneously read in the first pixel and the second pixel. Such control is hereinafter referred to as "the capacitive elements are crossed between the first pixel and the second pixel to perform simultaneous reading".

6. Variations of Pixel Differences

Variations of the pixel difference outputs will be described with reference to FIGS. 7 and 8.

Figure 7:
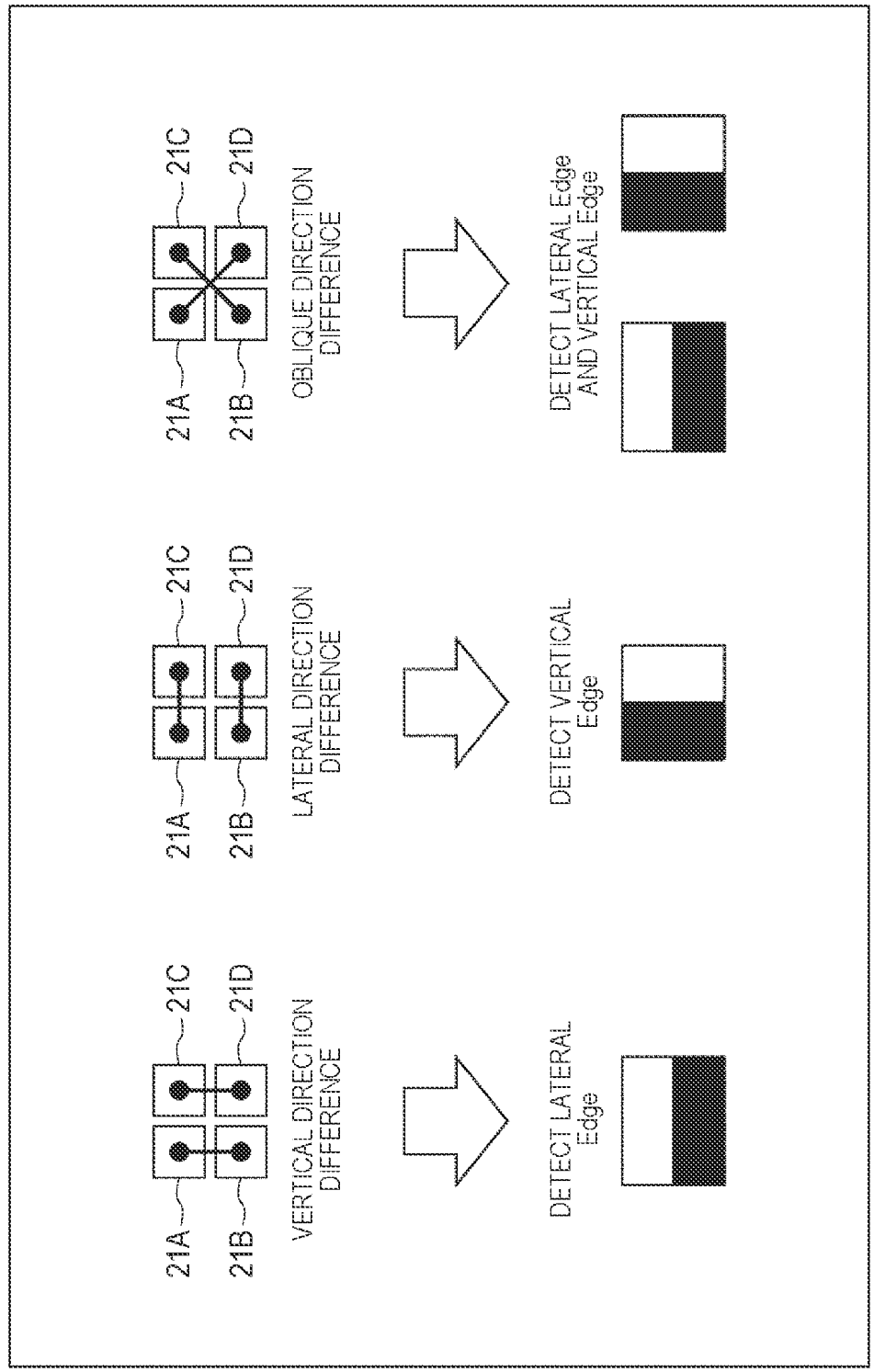
FIG. 7 is a diagram for explaining variations of pixel difference outputs.

The reading control for outputting the pixel difference between the pixel 21A and the pixel 21B described in FIG. 6 is control for outputting a difference between two pixels arranged in the vertical direction (column direction) in the sharing unit 20 as illustrated on the left side of FIG. 7. By the similar control, the pixel difference between the pixel 21C and the pixel 21D can also be output.

Such a pixel difference output of two pixels in the vertical direction can accurately detect a luminance difference in the vertical direction, in other words, an edge in the lateral direction in the luminance image.

Furthermore, as illustrated in the center of FIG. 7, the solid-state imaging device 1 can output a difference between two pixels arranged in the lateral direction by crossing the capacitive elements between two pixels arranged in the lateral direction (row direction) in the sharing unit 20 and performing simultaneous reading. For example, a difference between the pixel 21A and the pixel 21C can be output by crossing the capacitive elements between the pixel 21A and the pixel 21C and performing simultaneous reading. Furthermore, for example, a difference between the pixel 21B and the pixel 21D can be output by crossing the capacitive elements between the pixel 21B and the pixel 21D and performing simultaneous reading.

Such a pixel difference output of two pixels in the lateral direction can accurately detect a luminance difference in the lateral direction, in other words, an edge in the vertical direction in the luminance image.

Furthermore, as illustrated on the right side of FIG. 7, the solid-state imaging device 1 can output a difference between two pixels arranged in an oblique direction by crossing the capacitive elements between two pixels arranged in the oblique direction in the sharing unit 20 and performing simultaneous reading. For example, a difference between the pixel 21A and the pixel 21D can be output by crossing the capacitive elements between the pixel 21A and the pixel 21D and performing simultaneous reading. Furthermore, for example, a difference between the pixel 21B and the pixel 21C can be output by crossing the capacitive elements between the pixel 21B and the pixel 21C and performing simultaneous reading.

Such a pixel difference output of two pixels in the lateral direction can efficiently and accurately detect both the luminance difference in the lateral direction and the luminance difference in the vertical direction, in other words, both the edge in the lateral direction and the edge in the vertical direction in the luminance image.

Since a general image sensor performs a reading operation in units of rows, the number of operations of detecting an edge in a vertical direction increases. However, originally, detection of both edges in the vertical direction and the lateral direction improves accuracy of focus control or the like for detecting phase difference information of an image.

According to the above-described control of the solid-state imaging device 1, any of the vertical direction difference, the lateral direction difference, and the oblique direction difference can be performed, and switching is easy.

Figure 8:
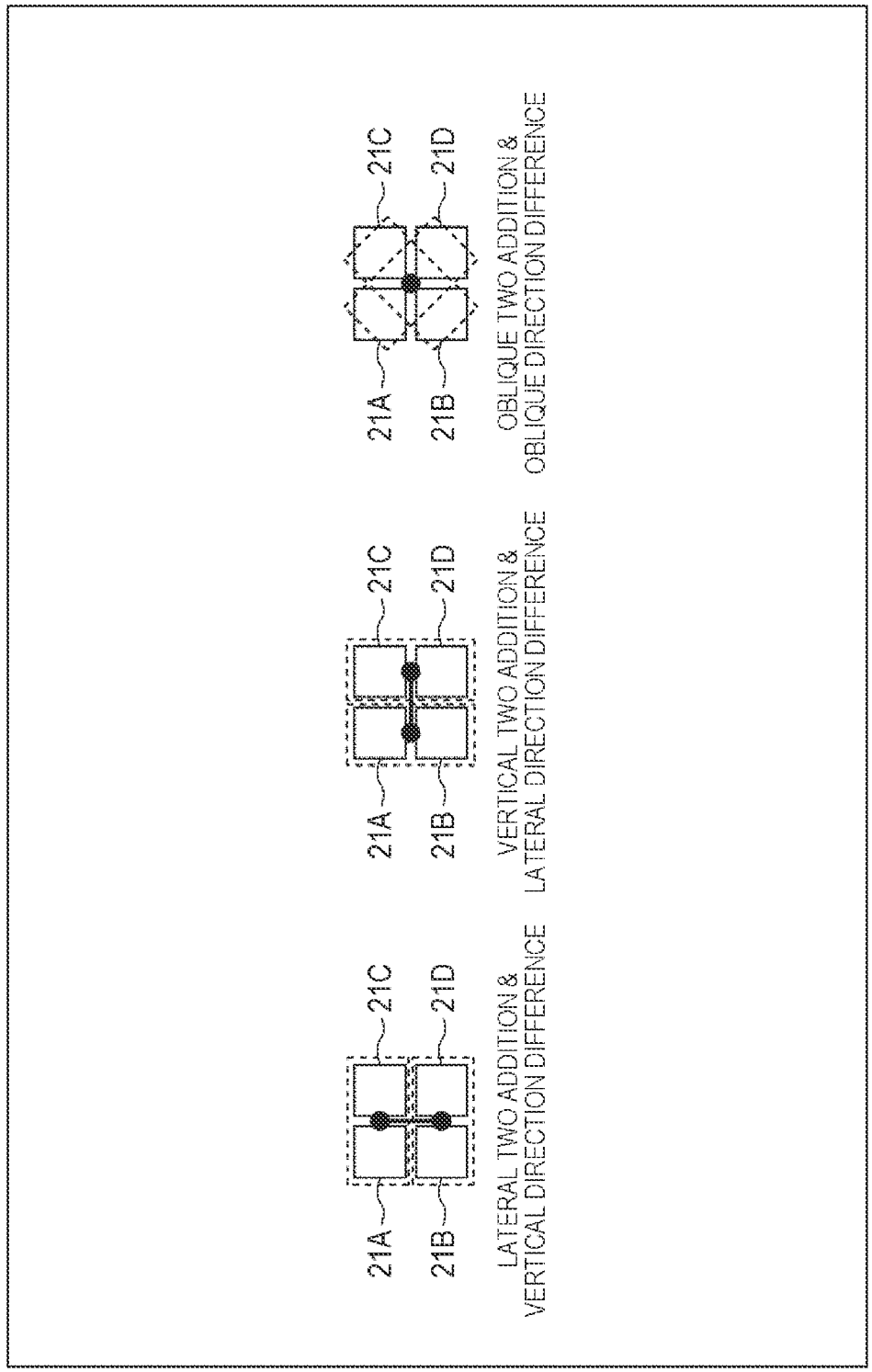
FIG. 8 is a diagram for explaining variations of pixel difference outputs.

FIG. 8 illustrates an example of a combination of the pixel difference output and the pixel addition.

The two pixels to be added are regarded as one pixel of the first pixel or the second pixel, and the capacitive elements are crossed between the first pixel and the second pixel to perform simultaneous reading, so that the pixel difference output in units of two pixels can be performed.

For example, as illustrated on the left side of FIG. 8, in the solid-state imaging device 1, the capacitive elements are crossed between the upper two pixels of the pixels 21A and 21C and the lower two pixels of the pixels 21B and 21D in the sharing unit 20 to perform simultaneous reading, so that a difference (vertical direction difference) between the upper two pixel addition data of the pixel 21A and the pixel 21B and the lower two pixel addition data of the pixel 21C and the pixel 21D can be obtained by one reading operation.

Furthermore, for example, as illustrated in the center of FIG. 8, in the solid-state imaging device 1, the capacitive elements are crossed between the left two pixels of the pixels 21A and 21B and the right two pixels of the pixels 21C and 21D in the sharing unit 20 to perform simultaneous reading, so that a difference (lateral direction difference) between the left two pixel addition data of the pixels 21A and 21B and the right two pixel addition data of the pixels 21C and 21D can be obtained by one reading operation.

Furthermore, as illustrated on the right side of FIG. 8, the solid-state imaging device 1 causes the capacitive elements to be crossed between the left oblique two pixels of the pixels 21A and 21D and the right oblique two pixels of the pixels 21B and 21C in the sharing unit 20 to perform simultaneous reading, so that a difference (oblique direction difference) between the left oblique two pixel addition data of the pixels 21A and 21D and the right oblique two pixel addition data of the pixels 21B and 21C can be obtained by one reading operation.

The SN ratio can be improved by combining the pixel difference output and the pixel addition.

In FIG. 8, black circles shown in the four pixels of the pixels 21A to 21D indicate the centroid positions of the two pixels subjected to pixel addition. In the pixel addition and the pixel difference output in the oblique direction, the centroid positions of the left oblique two pixels of the pixels 21A and 21D and the centroid positions of the right oblique two pixels of the pixels 21B and 21C coincide with each other.

7. Another Configuration Examples of Column Signal Processing Circuit

Figure 9:
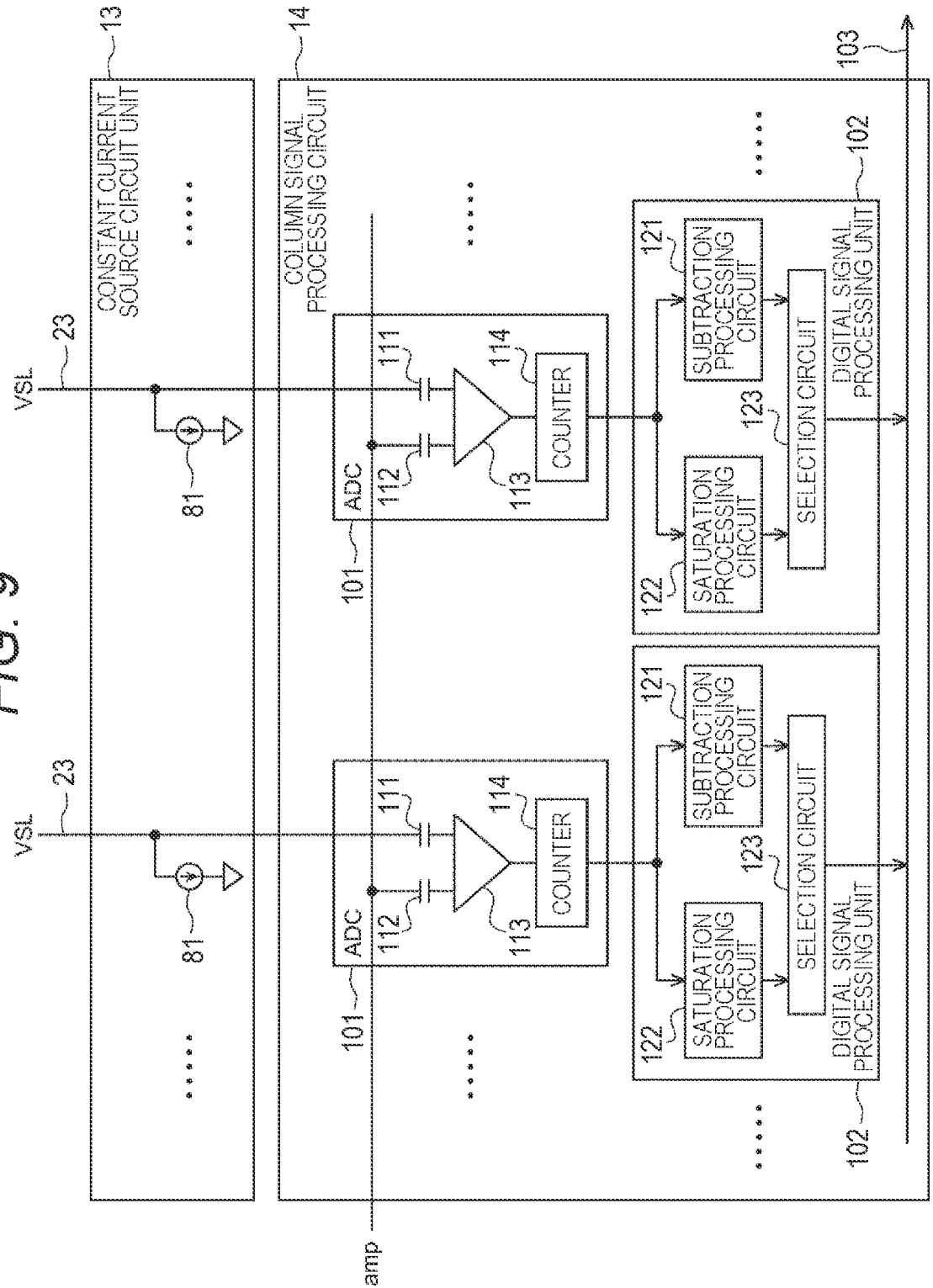
FIG. 9 is a block diagram illustrating another configuration example of the column signal processing circuit.

FIG. 9 is a block diagram illustrating another configuration example of the column signal processing circuit 14. Similarly to FIG. 3, FIG. 9 also illustrates the constant current source circuit unit 13.

In FIG. 9, parts corresponding to those in the configuration illustrated in FIG. 3 are denoted by the same reference numerals, and description of the parts will be omitted as appropriate, and description will be given focusing on different parts.

A column signal processing circuit 14 in FIG. 9 is different from the column signal processing circuit 14 in FIG. 3 in that the digital signal processing unit 102 includes a saturation detection circuit 122 and a selection circuit 123 in addition to the subtraction processing circuit 121, and is common to the column signal processing circuit 14 in FIG. 3 in other points.

The saturation detection circuit 122 detects whether or not the signal level of the pixel signal VSL output from the pixel 21 is saturated in each of the first AD conversion period and the second AD conversion period.

Figure 10:
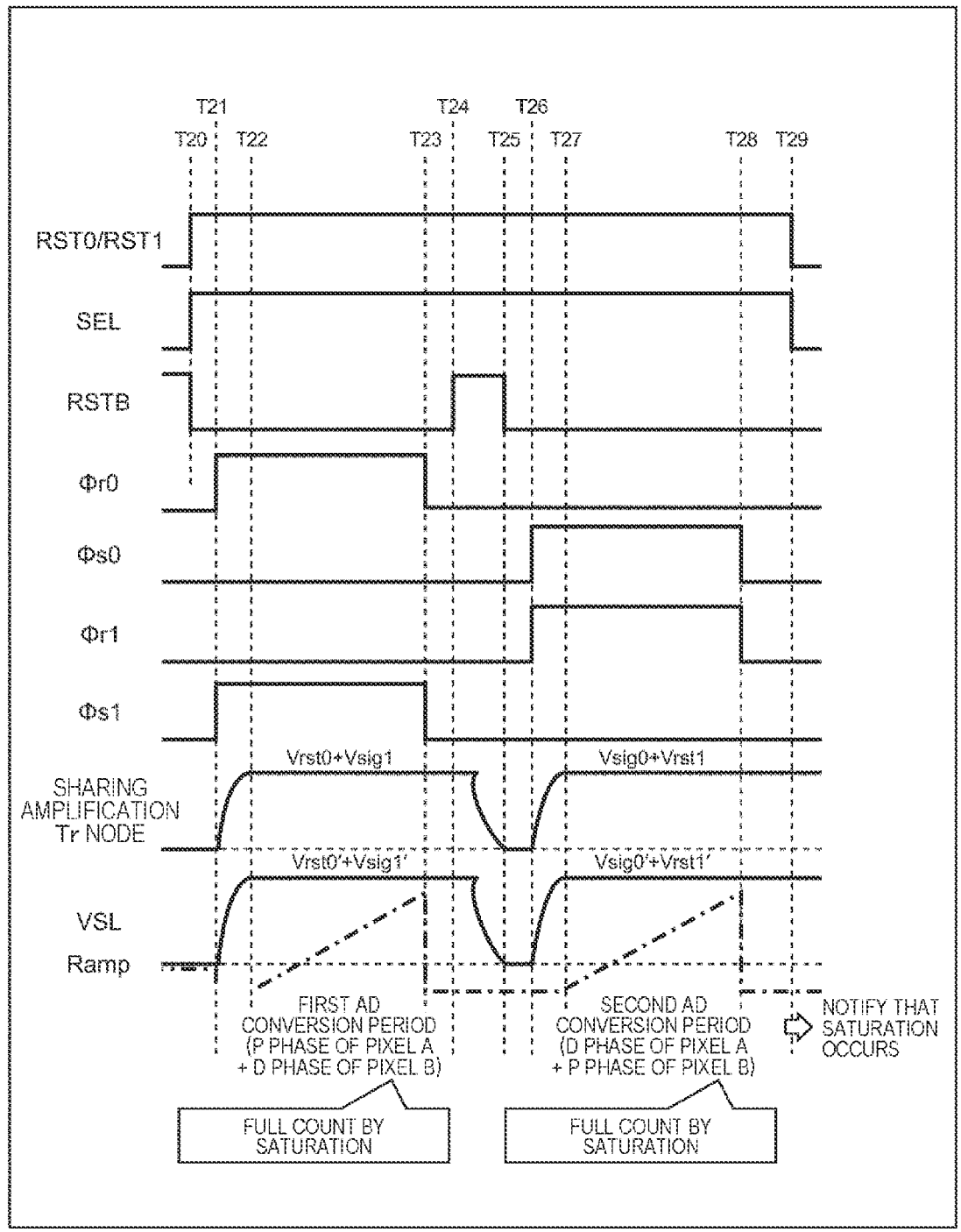
FIG. 10 is a timing chart for explaining an operation in a case where a pixel signal is saturated.

FIG. 10 illustrates a timing chart in a case where the pixel signal VSL is saturated in each of the first AD conversion period and the second AD conversion period.

In a case where saturation of the pixel signal VSL occurs, the pixel signal VSL and the ramp signal Ramp are not equal to each other, and the count value becomes the upper limit value (full count) and is supplied to the saturation detection circuit 122.

Returning to FIG. 9, in a case where the upper limit value of the count value is supplied from the counter 115 in each of the first AD conversion period and the second AD conversion period, the saturation detection circuit 122 notifies the selection circuit 123 that the pixel 21 is saturated.

The pixel data as a subtraction processing result is supplied from the subtraction processing circuit 121 to the selection circuit 123, and in a case where saturation occurs, the saturation detection circuit 122 notifies the selection circuit 123 of the occurrence of saturation from. In a case where saturation does not occur in each of the first AD conversion period and the second AD conversion period, the selection circuit 123 supplies the pixel data from the subtraction processing circuit 121 to the output unit 17 via the signal line 103.

On the other hand, in a case where saturation occurs in each of the first AD conversion period and the second AD conversion period, the selection circuit 123 supplies a value indicating that the pixel data is an error to the output unit 17 via the signal line 103. Furthermore, in a case where saturation occurs in either the first AD conversion period or the second AD conversion period, the selection circuit 123 supplies the pixel data from the subtraction processing circuit 121 and a value indicating that there is a possibility that the pixel data is an error to the output unit 17 via the signal line 103.

According to the configuration example of the column signal processing circuit 14 illustrated in FIG. 9, it is possible to notify the external data transmission destination that the pixel signal VSL is saturated or pixel data with low reliability having a possibility of being saturated.

8. Hybrid of Spatial Difference Output and Single Pixel Luminance Output

In the above-described example, it has been described that each pixel 21 arranged in a matrix in the pixel array unit 11 is either the pixel 21 that performs the pixel signal output (hereinafter, it is referred to as single pixel luminance output) in units of one pixel described in FIG. 5 or the pixel 21 that performs the difference output (hereinafter, it is referred to as spatial difference output) in the vertical direction, the lateral direction, or the oblique direction described in FIG. 6.

However, in the pixel array unit 11, it is also possible to perform control in which the pixel 21 that performs single pixel luminance output and the pixel 21 that performs spatial difference output are mixed.

For example, it is possible to control the plurality of pixels 21 in the sharing unit 20 to mix the pixel 21 that performs single pixel luminance output and the pixel 21 that performs spatial difference output. Specifically, as illustrated in A of FIG. 11, the solid-state imaging device 1 can perform control such that, among the four pixels of the pixels 21A to 21 constituting the sharing unit 20, two pixels of the pixels 21A and 21D in the leftward oblique direction perform spatial difference output in the oblique direction as the pixels 21 that perform spatial difference output, and two pixels of the pixels 21B and 21C in the rightward oblique direction perform single pixel luminance output as the pixels 21 that perform single pixel luminance output.

Figure 11:
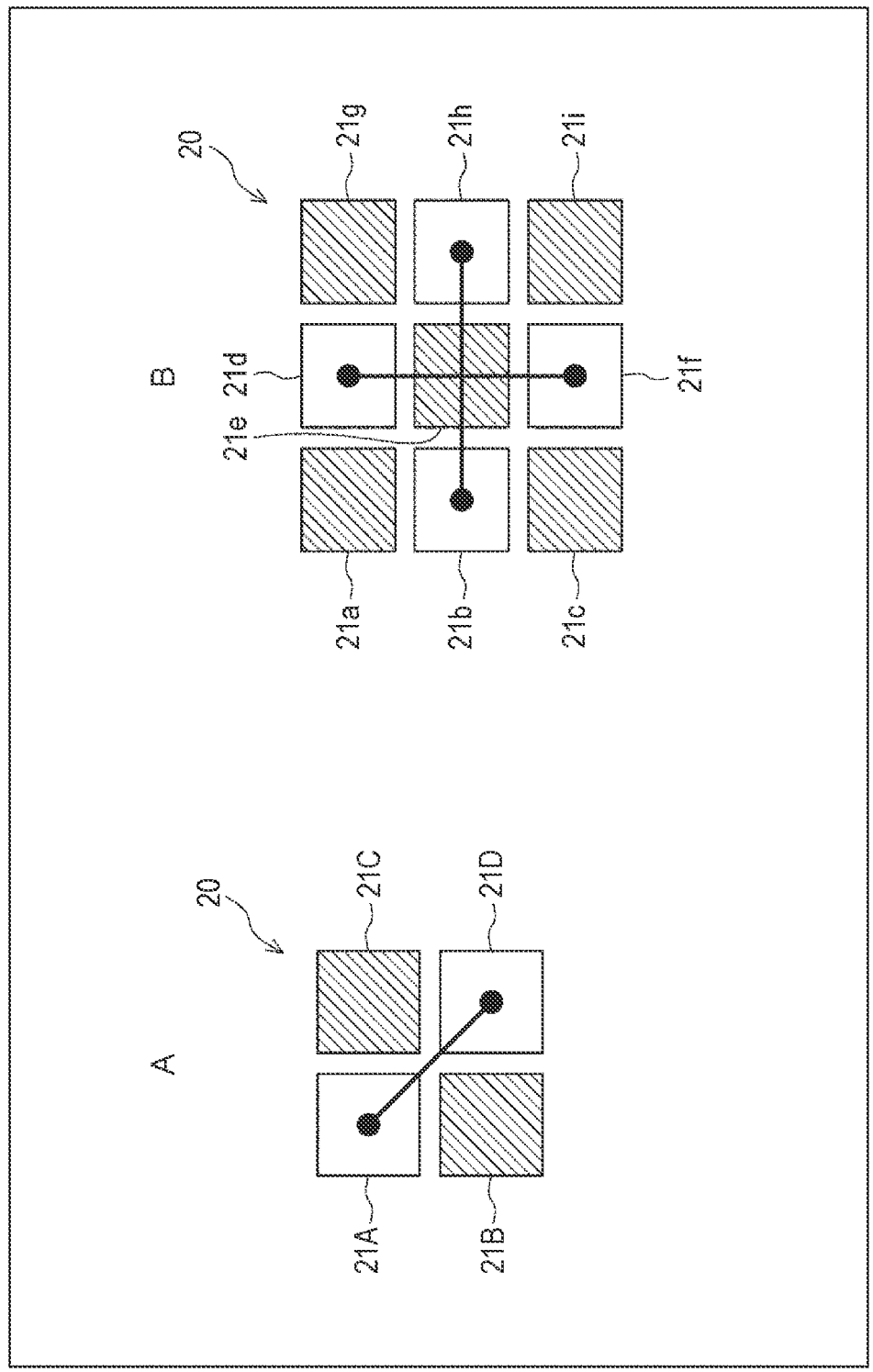
FIG. 11 is a diagram for explaining an example of a hybrid of spatial difference output and single pixel luminance output.

Furthermore, for example, as illustrated in B of FIG. 11, in a case where the sharing unit 20 includes nine pixels of 3×3 including pixels 21a to 21i, the solid-state imaging device 1 can perform control such that spatial difference output in the lateral direction is performed by two pixels of the pixels 21b and 21h, spatial difference output in the vertical direction is performed by two pixels of the pixels 21d and 21f, and single pixel luminance output is performed by the remaining pixels 21a, 21c, 21e, 21g, and 21i.

Since whether to perform single pixel luminance output or spatial difference output is only to change the ON timing of the selection transistors 51 and 52, in other words, the Hi level periods of the selection signal Φr and the selection signal Φs, it is easy to select and switch the control.

The plurality of pixel positions where spatial difference output is performed is not limited to the examples of A and B in FIG. 11, and can be arbitrarily determined. For example, among the four pixels of 2×2 in A of FIG. 11, two pixels in the vertical direction may be set as the pixels 21 that perform spatial difference output, and the remaining two pixels in the vertical direction may be set as the pixels 21 that perform single pixel luminance output. Furthermore, the pixel signals VSL of the plurality of pixels 21 that performs single pixel luminance output may be simultaneously read and subjected to pixel addition.

Figure 12:
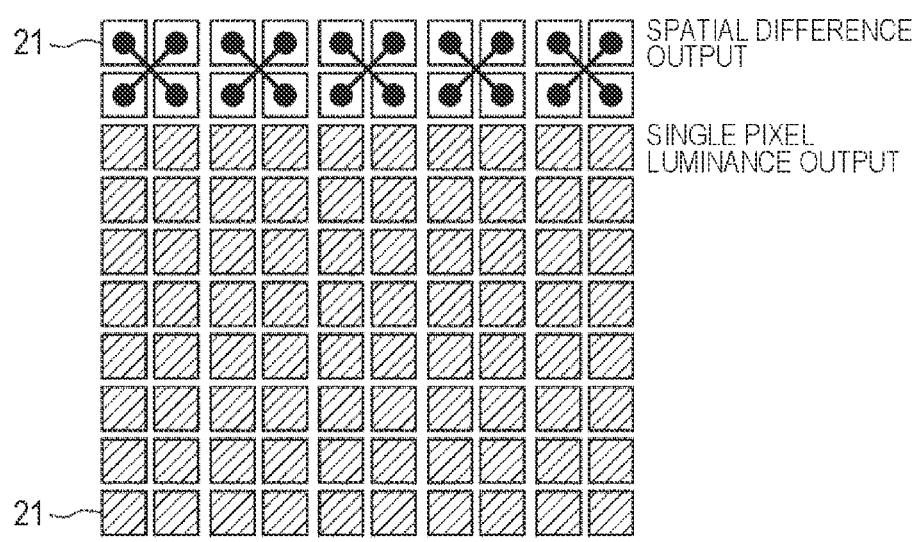
FIG. 12 is a diagram for explaining an example of a hybrid of spatial difference output and single pixel luminance output.

Furthermore, as illustrated in FIG. 12, the pixel 21 that performs single pixel luminance output and the pixel 21 that performs spatial difference output may be mixed in units of rows of the pixel array unit 11. Switching of control in units of rows is easy to implement.

The number of rows of the pixels 21 that perform spatial difference output is arbitrary, and the ratio of the number of rows of the pixels 21 that perform spatial difference output and the number of rows of the pixels 21 that perform single pixel luminance output in the pixel array unit 11 is also arbitrary. The control of the pixels 21 that perform spatial difference output and the control of the pixels 21 that perform single pixel luminance output may be switched in a predetermined row unit. The row of the pixels 21 that perform spatial difference output may be operated at a higher frame rate than the row of the pixels 21 that perform single pixel luminance output.

Figure 13:
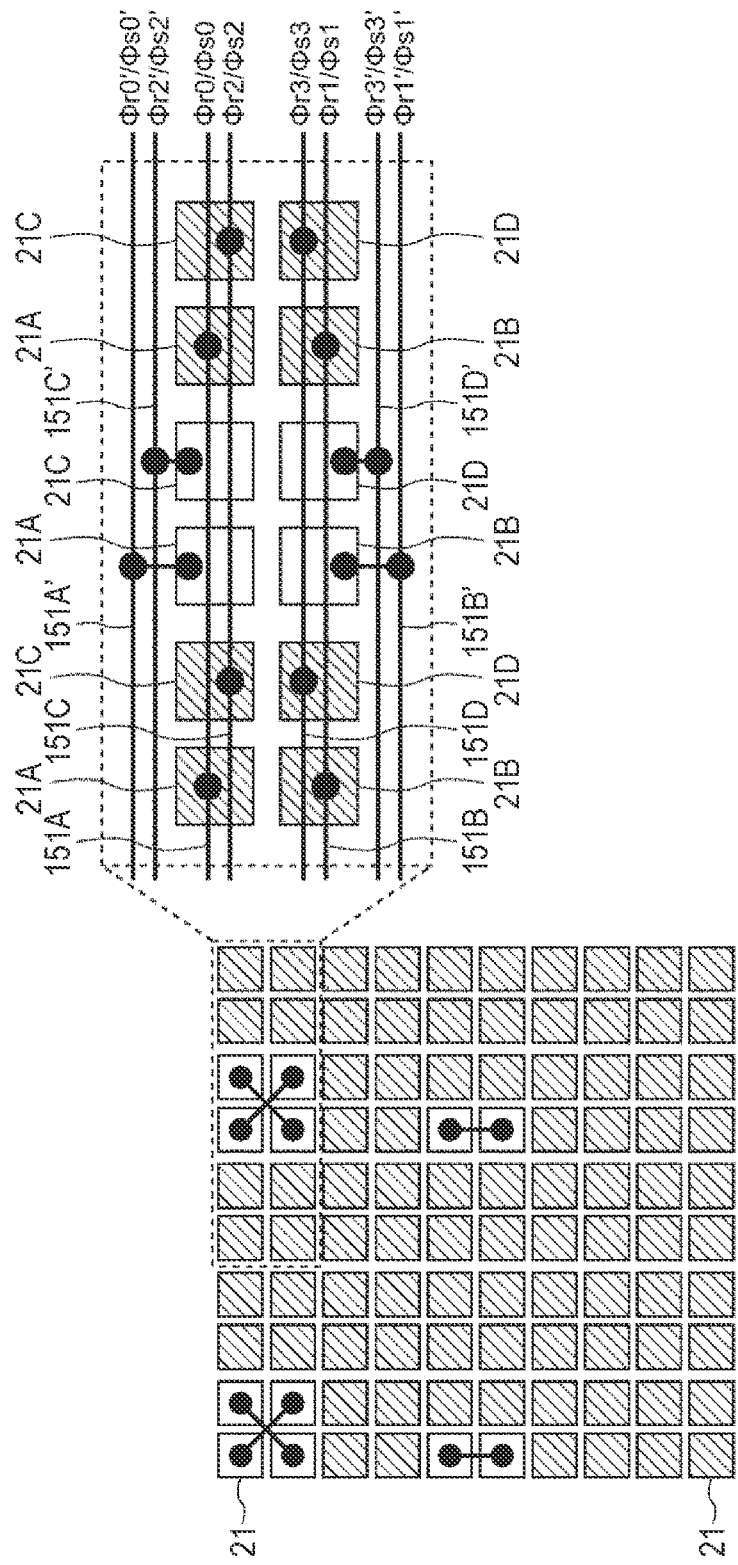
FIG. 13 is a diagram for explaining an example of a hybrid of spatial difference output and single pixel luminance output.

Furthermore, as illustrated in FIG. 13, among the same row of the pixel array unit 11, the pixels 21 that perform single pixel luminance output and the pixels 21 that perform spatial difference output may be mixed, and the pixels 21 that perform spatial difference output may be distributed at an arbitrary density in the pixel array unit 11.

However, in this case, it is necessary to make the Hi level periods of the selection signal Φr and the selection signal Φs different between the pixels 21 that perform single pixel luminance output and the pixels 21 that perform spatial difference output in the same row. Therefore, as illustrated in an enlarged diagram surrounded by a broken line in FIG. 13, it is necessary to divide the signal lines of the selection signal Φr and the selection signal Φs between the pixels 21 that perform single pixel luminance output and the pixels 21 that perform spatial difference output in the same row. In the enlarged diagram of FIG. 13, signal lines 151A' to 151D' that transmit the selection signal Φr and the selection signal Φs to the pixels 21 that perform spatial difference output are provided separately from signal lines 151A to 151D that transmit the selection signal Φr and the selection signal Φs to the pixels 21 that perform single pixel luminance output in the same row.

Note that, since the signal line 151 that transmits the selection signal Φr is different from the signal line 151 that transmits the selection signal Φs, two signal lines 151 are originally provided for one pixel 21, but in FIG. 13, for convenience of space, they are represented by one signal line 151.

In the same row, the number of the pixels 21 that perform spatial difference output is arbitrary, and the ratio of the number of the pixels 21 that perform spatial difference output and the number of the pixels 21 that perform single pixel luminance output in the pixel array unit 11 is also arbitrary. The pixels 21 that perform spatial difference output in the vertical direction, the lateral direction, or the oblique direction may be arbitrarily arranged. The pixels 21 that perform spatial difference output may be operated at a higher frame rate than the pixels 21 that perform single pixel luminance output.

The control of mixing the pixels 21 that perform spatial difference output and the pixels 21 that perform single pixel luminance output in the sharing unit 20 illustrated in FIG. 11, the control of mixing the pixels 21 that perform single pixel luminance output and the pixels 21 that perform spatial difference output illustrated in FIG. 12 in units of rows, and the control of mixing the pixels 21 that perform single pixel luminance output and the pixels 21 that perform spatial difference output in the same row illustrated in FIG. 13 may be arbitrarily combined in the pixel array unit 11.

9. Moving Object Detection Processing

Moving object detection processing that can be executed using the control of the oblique direction difference illustrated on the right side of FIG. 8, that is, the control of obtaining a difference between the two pixel addition data of the left oblique pixels 21A and 21D and the two pixel addition data of the right oblique pixels 21B and 21C in the sharing unit 20 including four pixels of 2×2 will be described.

Figure 14:
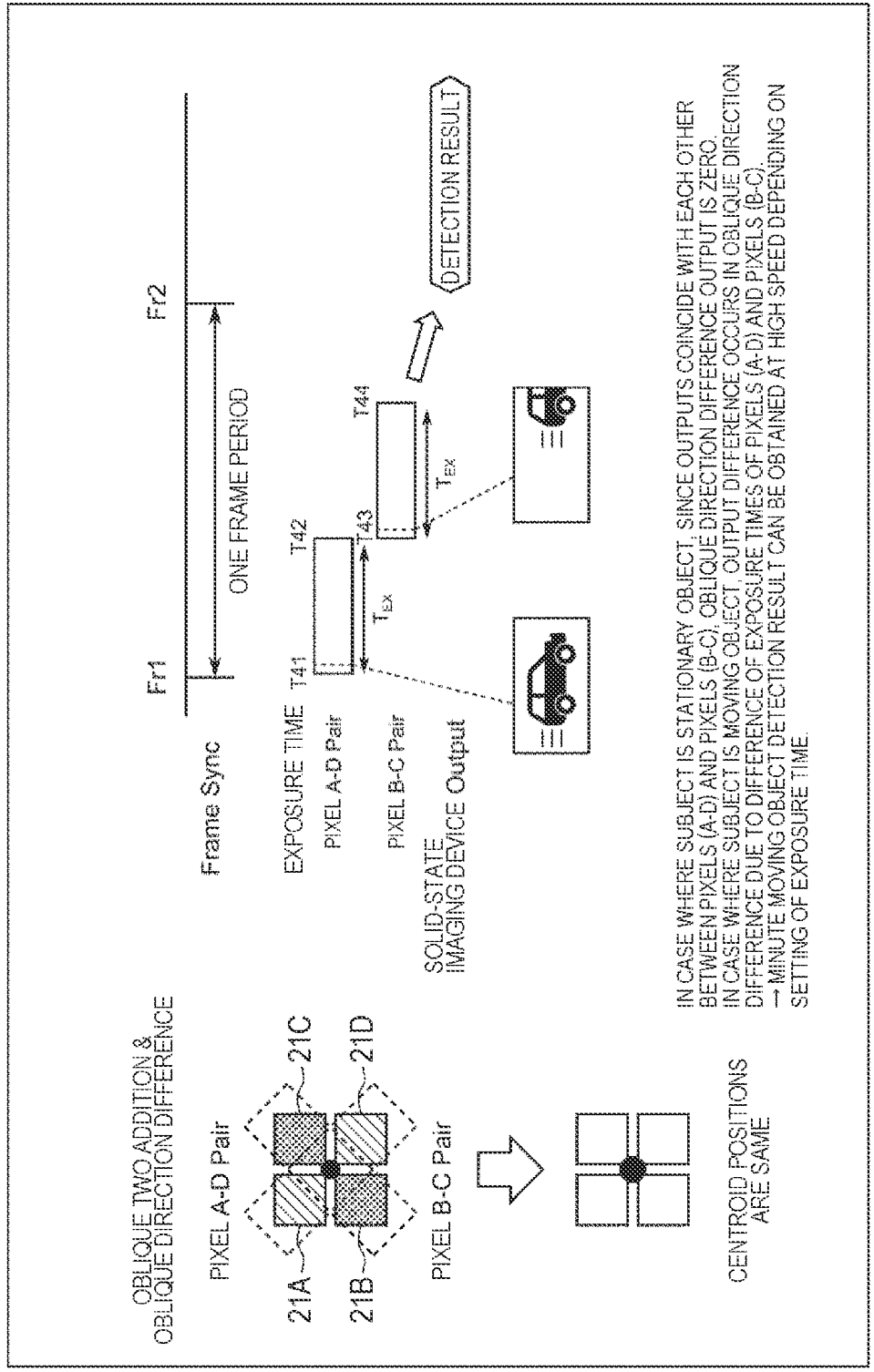
FIG. 14 is a diagram for explaining an example of moving object detection processing using two pixel addition and an oblique direction difference.

FIG. 14 is a diagram for explaining moving object detection processing executed using control of an oblique direction difference.

In the pixel difference output in the oblique direction described above, the exposure timings are the same in all the pixels, but in a case where the moving object detection processing is performed, the solid-state imaging device 1 performs control so that the exposure timings are different between the left oblique two pixels (the pixels 21A and 21D) and the right oblique two pixels (the pixels 21B and 21C) for obtaining the difference.

For example, as illustrated in FIG. 14, the vertical scanning circuit 12 of the solid-state imaging device 1 starts exposure of the pixels 21A and 21D, which are two left oblique pixels, at time T41, which is the first timing in one frame period, and ends the exposure at time T42 after the lapse of the $T_{EX}$ time, which is the exposure time. Furthermore, the vertical scanning circuit 12 starts exposure of the pixels 21B and 21C, which are right oblique two pixels, at time T43, which is the second timing in one frame period, and ends the exposure at time T44 after the lapse of the $T_{EX}$ time, which is the exposure time. Therefore, the left oblique two pixels and the right oblique two pixels have different exposure timings (exposure start times), but have the same exposure time.

As described with reference to FIG. 8, in the pixel addition and the pixel difference output of the two pixels in the oblique direction, there is a feature that the centroid positions of the two pixels in the left oblique direction and the centroid positions of the two pixels in the right oblique direction coincide with each other. Therefore, in a case where a subject imaged by the solid-state imaging device 1 is a stationary object, the oblique direction pixel difference output becomes zero in the two left oblique pixels and the two right oblique pixels. On the other hand, in a case where the subject is a moving object, an output difference occurs in the oblique direction pixel difference between the left oblique two pixels and the right oblique two pixels. The digital signal processing unit 102 can detect whether or not the subject is a moving object by determining whether or not the oblique direction pixel difference between the left oblique two pixels and the right oblique two pixels is equal to or less than a predetermined threshold. Since a moving object detection result can be obtained in the next frame, a minute moving object detection result can be obtained at high speed depending on the setting of the exposure time.

10. Configuration Example of Second Embodiment of Solid-State Imaging Device FIG. 15 is a block diagram illustrating a configuration example of a second embodiment of a solid-state imaging device according to the present disclosure.

Figure 15:
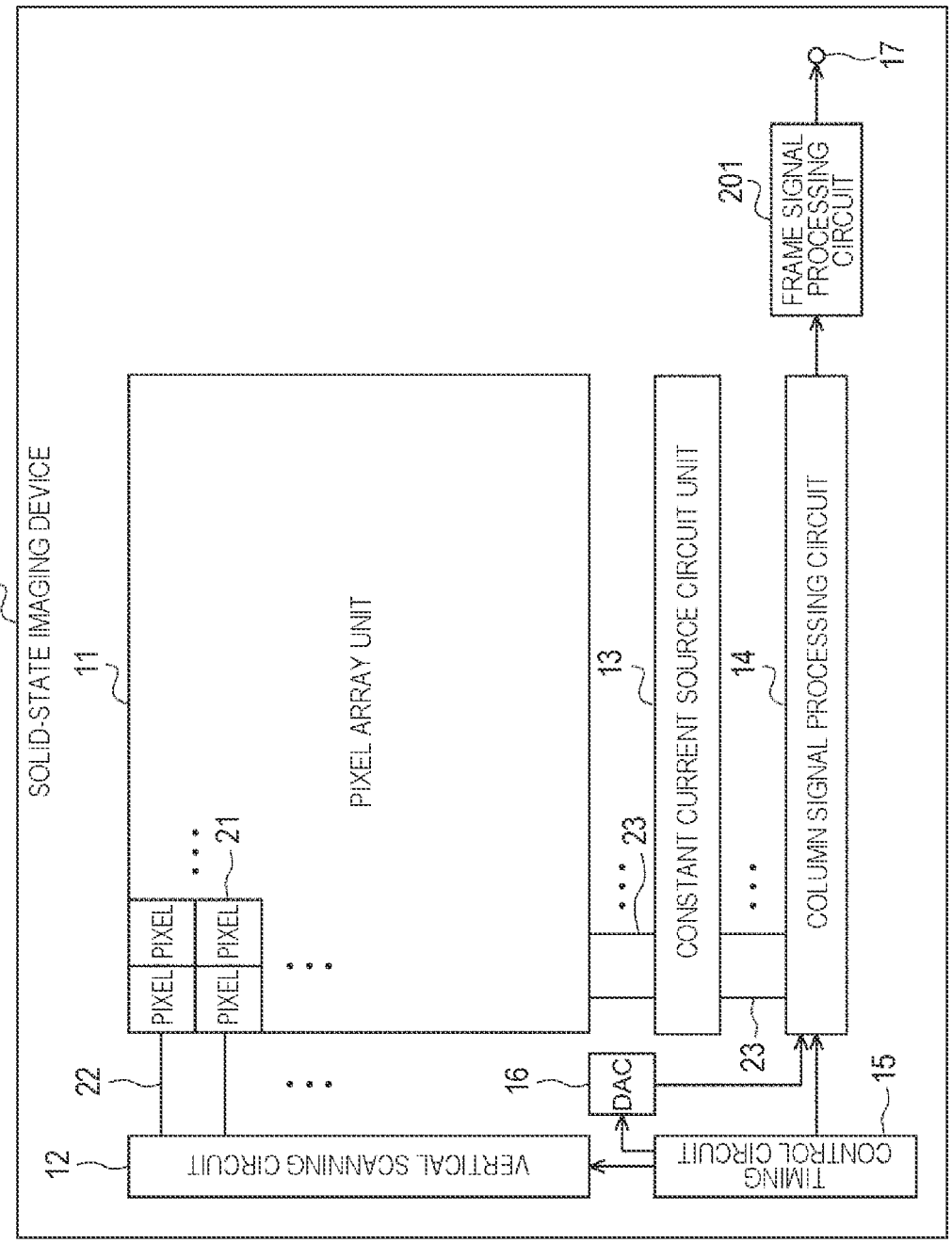
FIG. 15 is a block diagram illustrating a configuration example of a second embodiment of a solid-state imaging device according to the present disclosure.

In the second embodiment of FIG. 15, parts corresponding to those of the first embodiment illustrated in FIG. 1 are denoted by the same reference numerals, and description of the parts will be omitted as appropriate.

The second embodiment of FIG. 15 is different in that a frame signal processing circuit 201 is newly provided between the column signal processing circuit 14 and the output unit 17, and the other points are common.

The frame signal processing circuit 201 accumulates pixel data sequentially supplied in units of rows from the column signal processing circuit 14 in an internal memory to form a frame image, and performs predetermined image processing on the frame image, for example, high-resolution image generation processing (super-resolution processing) and the like. The image data after the predetermined image processing is output to an external device via the output unit 17.

11. First Image Processing Example of Second Embodiment

First image processing executed by the solid-state imaging device 1 of the second embodiment will be described with reference to FIGS. 16 to 18.

Figure 16:
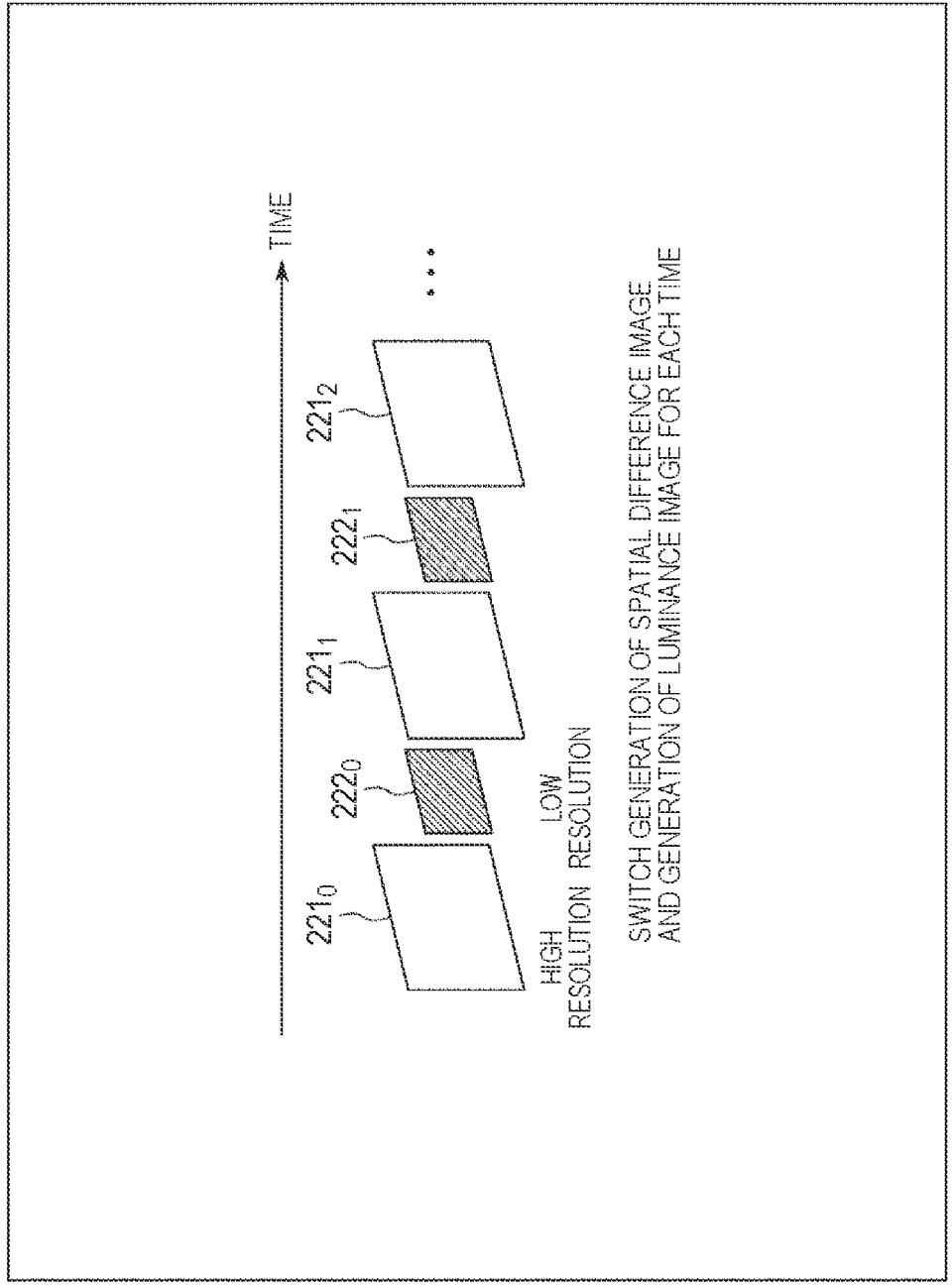
FIG. 16 is a diagram for explaining first image processing executed by the solid-state imaging device of the second embodiment.

As illustrated in FIG. 16, the solid-state imaging device 1 operates while switching between an operation of generating a spatial difference image 221 by the above-described spatial difference output control and an operation of generating a luminance image 222 by the above-described single pixel luminance output control at a predetermined timing. The spatial difference image 221 is generated with a high resolution equal to or higher than a predetermined resolution, but the luminance image 222 is generated with a lower resolution than the spatial difference image 221.

In FIG. 16, a spatial difference image $221_0$, a luminance image $222_0$, a spatial difference image $221_1$, a luminance image $222_1$, and a spatial difference image $221_2$, . . . are generated in time series, and the spatial difference images 221 and the luminance images 222 are alternately generated. Note that the spatial difference images 221 and the luminance images 222 are not necessarily generated alternately, and for example, one luminance image 222 may be generated every time a plurality of frames of the spatial difference image 221 is generated.

Figure 17:
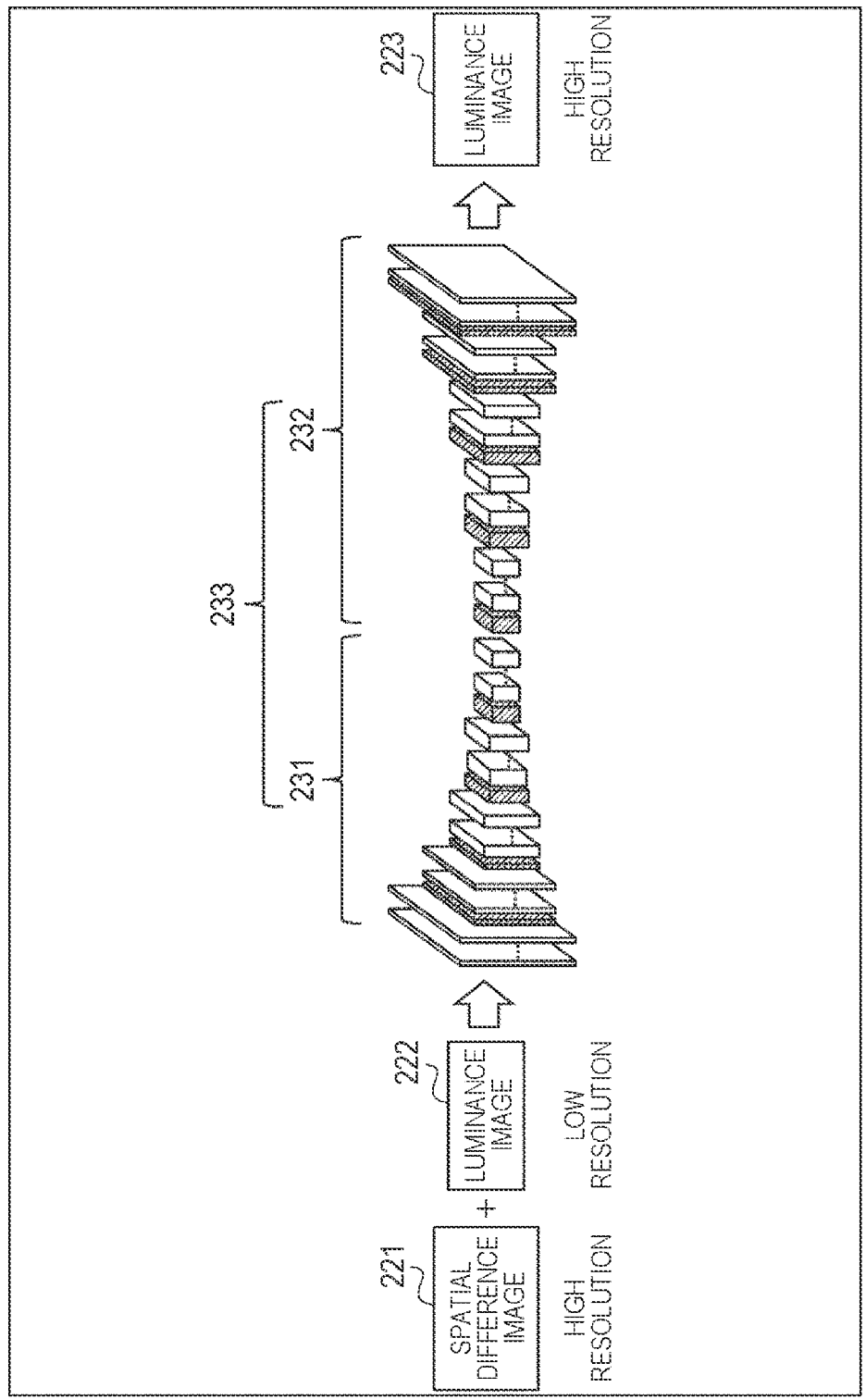
FIG. 17 is a diagram for explaining the first image processing executed by the solid-state imaging device of the second embodiment.

For example, as illustrated in FIG. 17, the frame signal processing circuit 201 executes high-resolution image generation processing of generating a high-resolution luminance image 223 from one high-resolution spatial difference image 221 and one low-resolution luminance image 222. For example, the frame signal processing circuit 201 generates the high-resolution luminance image 223 from one spatial difference image 221 and luminance image 222 by using a convolutional neural network (hereinafter, it is referred to as CNN) 233 including a convolutional network unit 231 and a deconvolutional network unit 232.

In general, since the data amount of the luminance image is large, the power consumption for generating the luminance image is larger than the power consumption for generating the spatial difference image. As described above, by performing the operation of generating the spatial difference image 221 with high resolution and generating the luminance image 222 with low resolution, the power consumption of the solid-state imaging device 1 can be reduced. Then, by generating and outputting the high-resolution luminance image 223 by the high-resolution image generation processing of the frame signal processing circuit 201, it is possible to output the high-resolution luminance image 223 while suppressing power consumption.

By generating and outputting the high-resolution luminance image 223, for example, in an electronic device such as a smartphone, an IoT device, a mobile body such as a drone, and a monitoring camera, it is possible to improve visibility while suppressing power consumption.

Note that the solid-state imaging device 1 may generate the luminance image and the spatial difference image in the spatial direction instead of generating the spatial difference image and the luminance image in the time direction (in time division).

Figure 18:
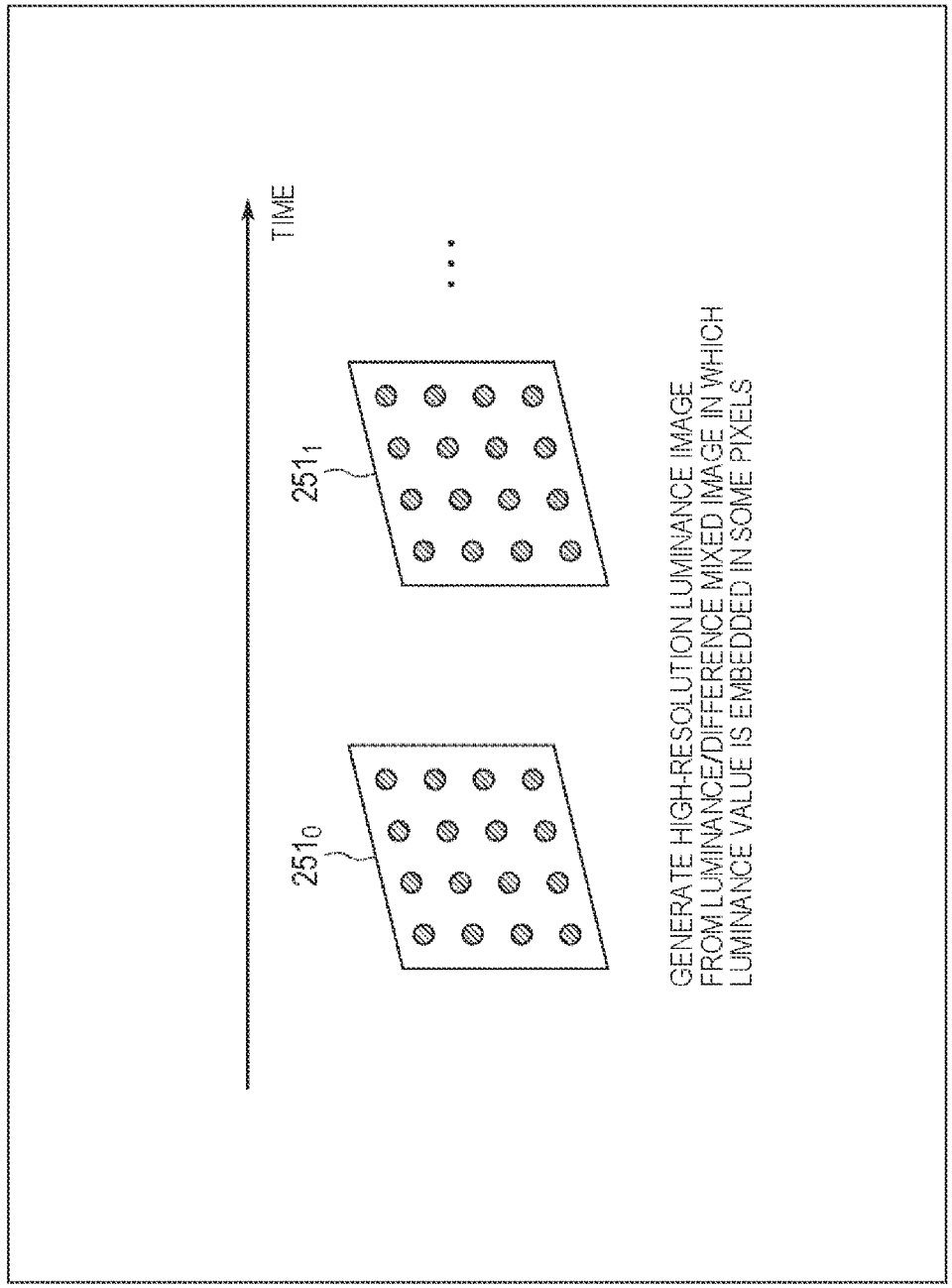
FIG. 18 is a diagram for explaining the first image processing executed by the solid-state imaging device of the second embodiment.

That is, as illustrated in FIG. 18, the solid-state imaging device 1 generates a luminance/difference mixed image 251 in which a luminance value is embedded in some pixels in the high-resolution spatial difference image with the number of low-resolution pixels by light reception control of the pixel array unit 11. In this case, the frame signal processing circuit 201 executes high-resolution image generation processing of generating the high-resolution luminance image 223 from the luminance/difference mixed image 251.

12. Second Image Processing Example of Second Embodiment

Second image processing executed by the solid-state imaging device 1 of the second embodiment will be described with reference to FIGS. 19 and 20.

Figure 19:
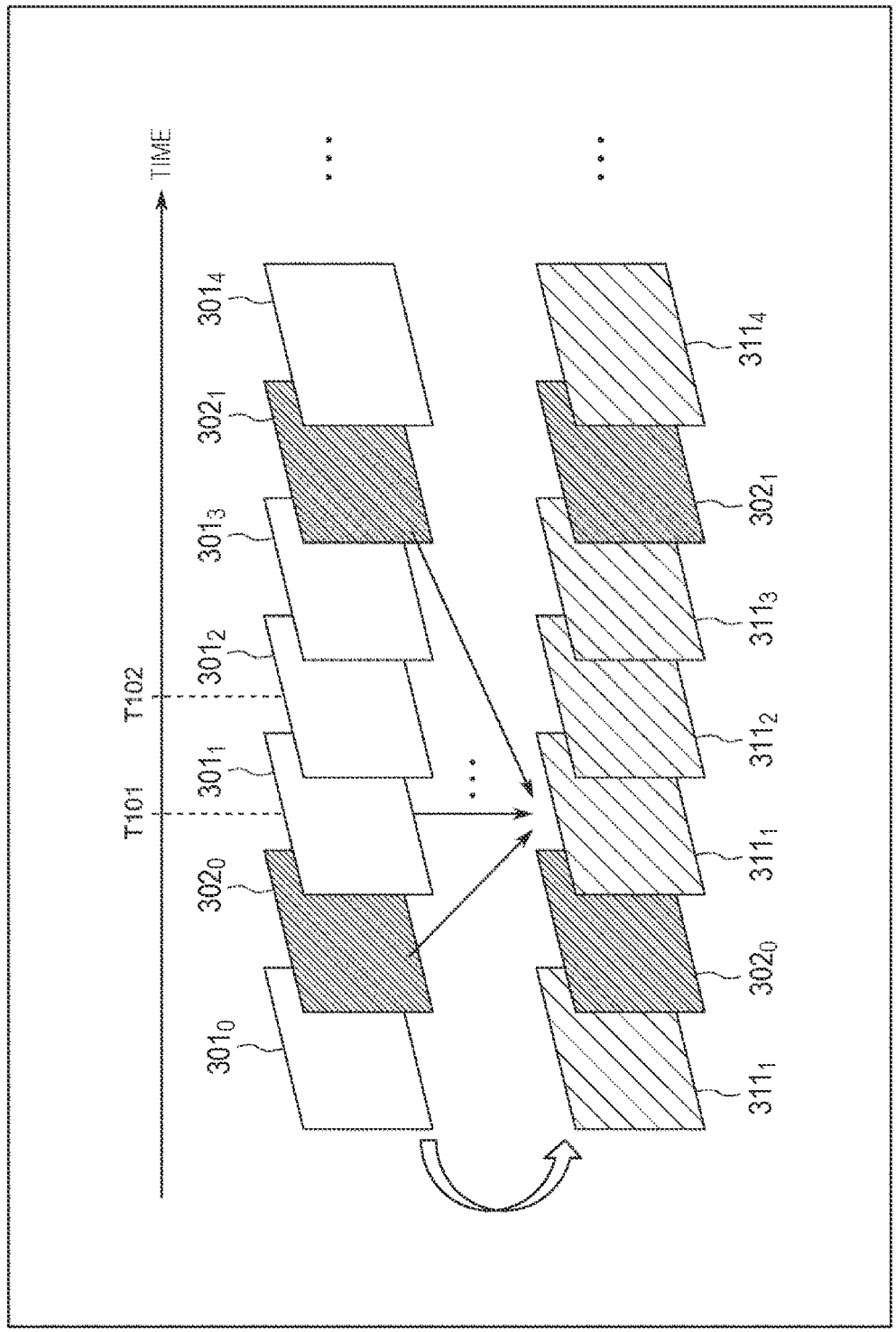
FIG. 19 is a diagram for explaining second image processing executed by the solid-state imaging device of the second embodiment.

FIG. 19 illustrates an example of processing of generating a high-resolution luminance image at a high frame rate by the frame signal processing circuit 201.

As illustrated in FIG. 19, the solid-state imaging device 1 operates while switching between an operation of generating a spatial difference image 301 by the above-described spatial difference output control and an operation of generating a luminance image 302 by the above-described single pixel luminance output control at a predetermined timing. The spatial difference image 301 and the luminance image 302 are generated with the same resolution and a high resolution equal to or higher than a predetermined resolution. In the example of FIG. 19, the luminance image 302 of one frame is generated every time three frames of the spatial difference image 301 are generated, but the timing at which the luminance image 302 is generated is not limited to this example. However, the number of generation frames of the spatial difference image 301 is larger than the number of generation frames of the luminance image 302.

The frame signal processing circuit 201 generates a luminance image 311 having the same resolution at the same time as that of the spatial difference image 301 from one spatial difference image 301 and two luminance images 302 generated before and after the spatial difference image 301 by machine learning, for example.

For example, the frame signal processing circuit 201 generates a high-resolution luminance image $311_1$ at time T101 by using three images of one spatial difference image $301_1$ generated at time T101, one luminance image $302_0$ generated at a time before time T101, and one luminance image $302_1$ generated at a time after time T101.

Similarly, the frame signal processing circuit 201 generates a high-resolution luminance image $311_2$ at time T102 by using three images of one spatial difference image $301_2$ generated at time T102, one luminance image $302_0$ generated at a time before the time T102, and one luminance image $302_1$ generated at a time after time T102.

As described above, the frame signal processing circuit 201 generates a high-density luminance image 303 from the spatial difference image 301 having the high density in the time direction and the luminance image 302 having the low density. The solid-state imaging device 1 generates the number of spatial difference images 301 larger than the number of luminance images 302 by light reception control of the pixel array unit 11. Then, by generating the high-resolution luminance image 303 by the frame signal processing circuit 201, it is possible to generate the high-resolution luminance image 303 at a high frame rate while suppressing power consumption of the solid-state imaging device 1.

Figure 20:
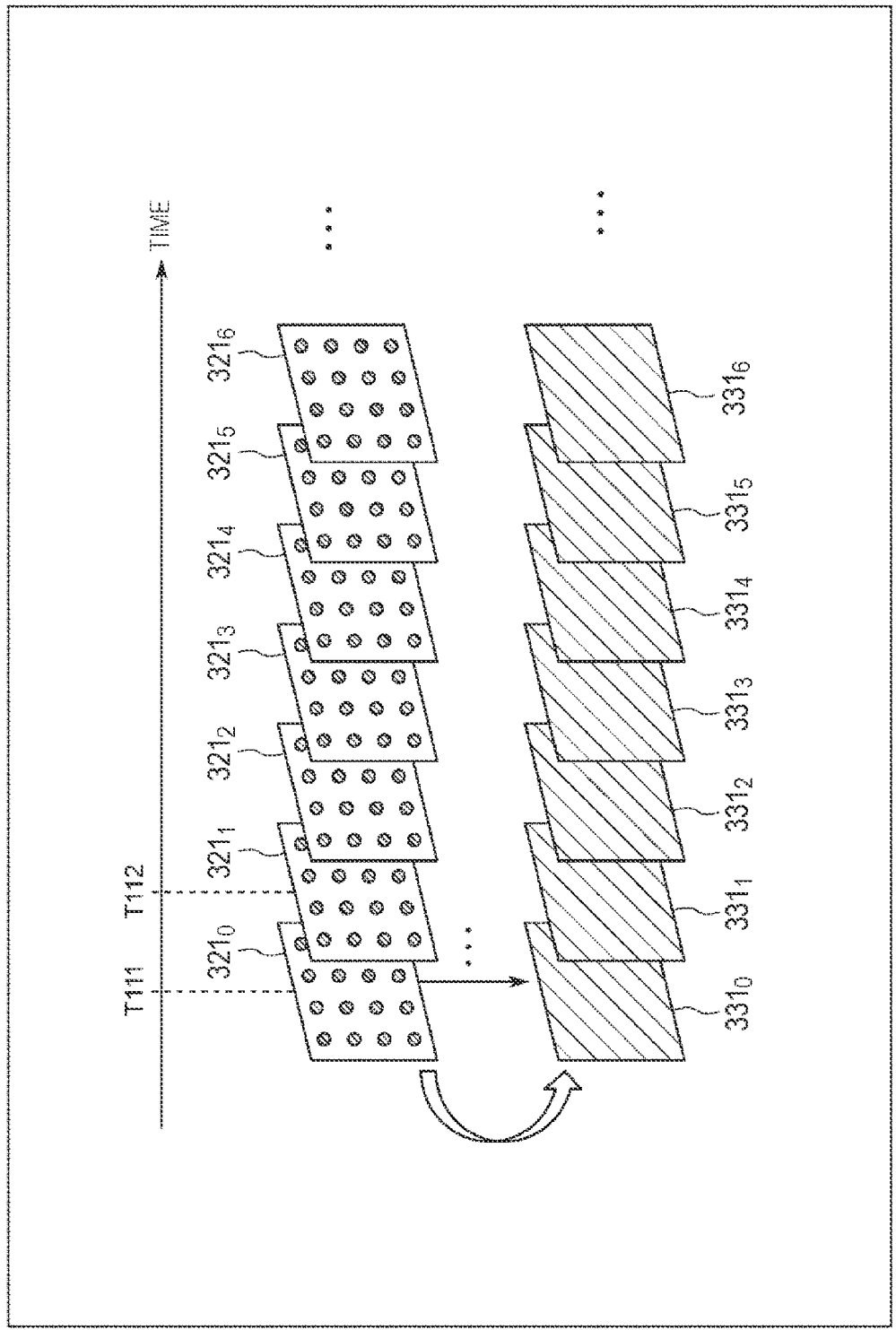
FIG. 20 is a diagram for explaining the second image processing executed by the solid-state imaging device of the second embodiment.

FIG. 20 illustrates another example of processing of generating a high-resolution luminance image at a high frame rate.

The solid-state imaging device 1 generates a luminance/difference mixed image 321 in which a luminance value is embedded in some pixels in the high-resolution spatial difference image with the number of low-resolution pixels in time series by light reception control of the pixel array unit 11. The frame signal processing circuit 201 generates a high-resolution luminance image 331 from the high-resolution luminance/difference mixed image 321.

For example, the frame signal processing circuit 201 generates a high-resolution luminance image $331_0$ at time T111 from one luminance/difference mixed image $321_0$ generated at time T111. Subsequently, the frame signal processing circuit 201 generates a high-resolution luminance image $331_1$ at time T112 from one luminance/difference mixed image $321_1$ generated at time T112. This similarly applies to a time after time T112.

As described above, the frame signal processing circuit 201 generates the high-density luminance image 331 from the luminance/difference mixed image 321 which is a combination of the spatial difference image having the high density in the spatial direction and the luminance image having the low density. By generating an image in which the density of the spatial difference image is higher than that of the luminance image in the luminance/difference mixed image 321, the solid-state imaging device 1 can generate the high-resolution luminance image 331 at a high frame rate while suppressing the power consumption of the solid-state imaging device 1.

The high resolution luminance images 311 and 331 generated at a high frame rate can be utilized as slow motion images.

13. Application Example to Electronic Device

Application of the technology of the present disclosure is not limited to that to the solid-state imaging device. That is to say, the technology of the present disclosure may be generally applied to electronic devices in which the solid-state imaging device is used in an image capturing unit (photoelectric converting unit) such as an imaging device such as a digital still camera and a video camera, a portable terminal device having an imaging function, and a copying machine in which the solid-state imaging device is used in the image reading unit. The solid-state imaging device may be formed as one chip, or may be in a module form having an imaging function in which an imaging unit and a signal processing unit or an optical system are packaged together.

Figure 21:
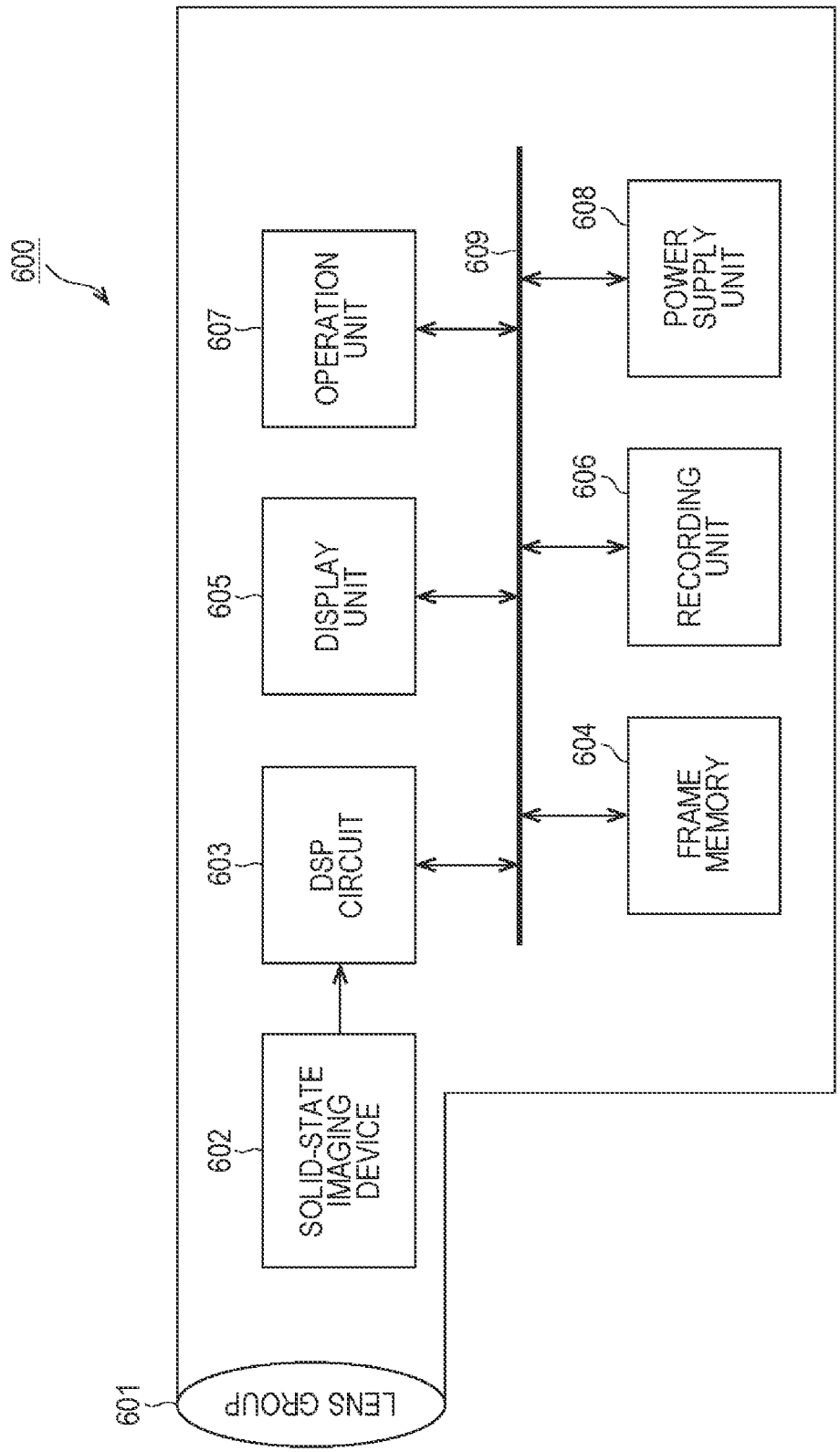
FIG. 21 is a block diagram illustrating a configuration example of an imaging device as an electronic device to which the technology of the present disclosure is applied.
Figure 22:
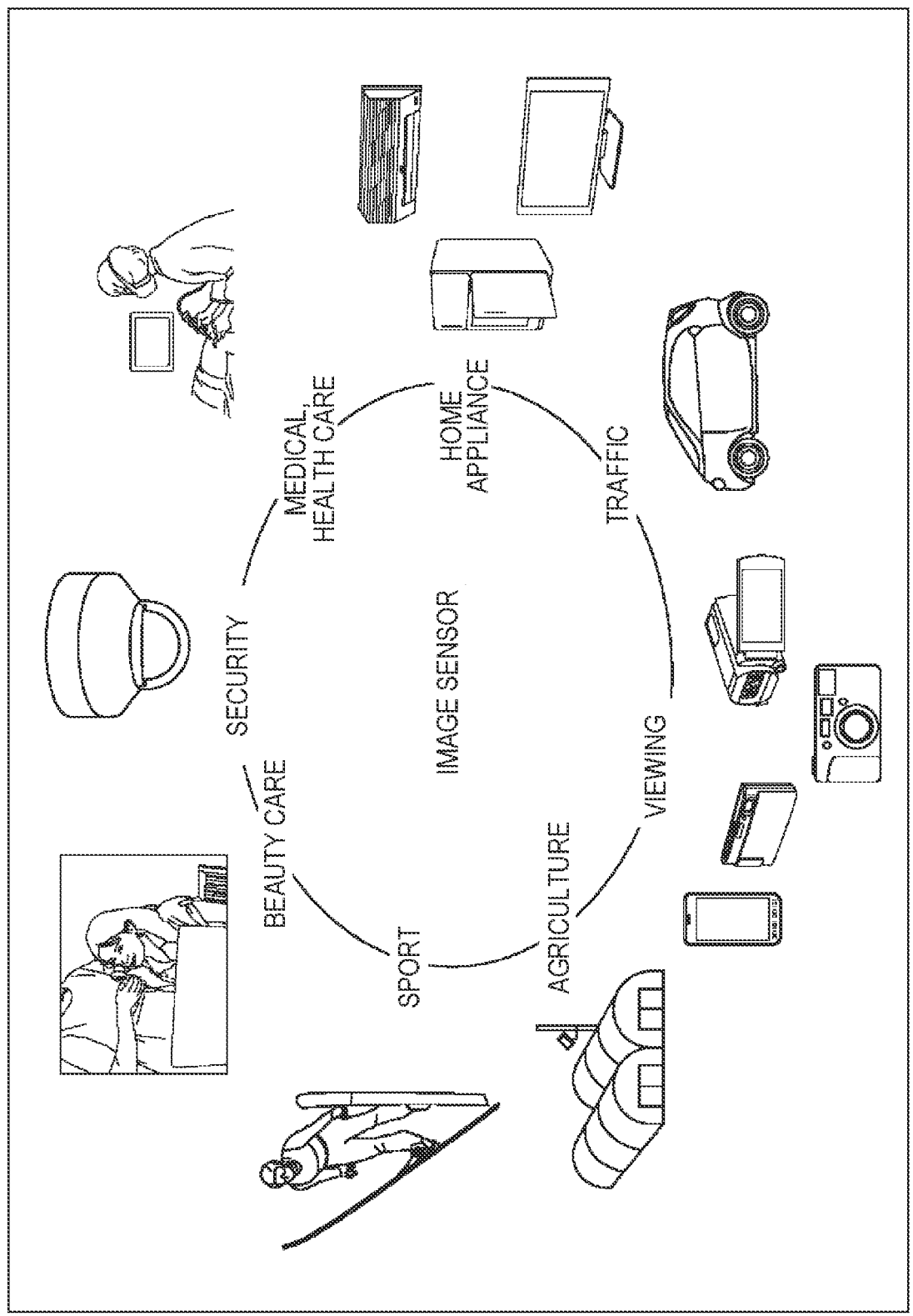
FIG. 22 is a diagram for explaining a usage example of an image sensor.

FIG. 21 is a block diagram illustrating a configuration example of an imaging device as an electronic device to which the technology of the present disclosure is applied.

An imaging device 600 in FIG. 21 includes an optical unit 601 including a lens group and the like, a solid-state imaging device (imaging device) 602 in which the configuration of the solid-state imaging device 1 in FIG. 1 is adopted, and a digital signal processor (DSP) circuit 603 that is a camera signal processing circuit. Furthermore, the imaging device 600 also includes a frame memory 604, a display unit 605, a recording unit 606, an operation unit 607, and a power supply unit 608. The DSP circuit 603, the frame memory 604, the display unit 605, the recording unit 606, the operation unit 607, and the power supply unit 608 are connected to one another via a bus line 609.

The optical unit 601 captures incident light (image light) from a subject and forms an image on an imaging surface of the solid-state imaging device 602. The solid-state imaging device 602 converts the light amount of the incident light imaged on the imaging surface by the optical unit 601 into an electrical signal in units of pixels and outputs the electrical signal as a pixel signal. As the solid-state imaging device 602, it is possible to use the solid-state imaging device 1 in FIG. 1, that is, a solid-state imaging device in which the sharing unit 20 includes the plurality of pixels 21 including the first pixel and the second pixel, and which controls spatial difference output in which capacitive elements are crossed between the first pixel and the second pixel to perform simultaneous reading.

The display unit 605 includes, for example, a thin display such as a liquid crystal display (LCD) or an organic electro luminescence (EL) display, and displays a moving image or a still image captured by the solid-state imaging device 602. The recording unit 606 records the moving image or the still image captured by the solid-state imaging device 602 on a recording medium such as a hard disk or a semiconductor memory.

The operation unit 607 issues operation commands for various functions of the imaging device 600 under an operation by a user. The power supply unit 608 appropriately supplies various kinds of power that is the operating power supply for the DSP circuit 603, the frame memory 604, the display unit 605, the recording unit 606, and the operation unit 607 to these supply targets.

As described above, by using the solid-state imaging device 1 to which the above-described embodiment is applied as the solid-state imaging device 602, it is possible to realize pixel differential output with low noise, high speed, low power consumption, and low cost. Therefore, even in the imaging device 600 such as a video camera, a digital still camera, or a camera module for a mobile device such as a mobile phone or the like, the image quality of the captured image can be improved.

Use Example of Image Sensor

FIG. 27 is a diagram illustrating a usage example of an image sensor using the above-described solid-state imaging device 1.

The above-described solid-state imaging device 1 can be used as an image sensor in various cases of sensing light such as visible light, infrared light, ultraviolet light, and X-rays as described below, for example.

- A device that captures an image to be used for viewing, such as a digital camera and a portable device with a camera function.
- A device for traffic use, such as an in-vehicle sensor which images the front, rear, surroundings, interior and the like of an automobile, a surveillance camera for monitoring traveling vehicles and roads, and a ranging sensor which measures a distance between vehicles and the like for safe driving such as automatic stop, recognition of a driver's condition and the like.
- A device for home appliance such as a television, a refrigerator, and an air conditioner that images a user's gesture and performs a device operation according to the gesture
- A device for medical and health care use, such as an endoscope and a device that performs angiography by receiving infrared light
- A device for security use, such as a security monitoring camera and an individual authentication camera
- A device for beauty care use, such as a skin measuring instrument for imaging skin, and a microscope for imaging the scalp
- A device for sport use, such as an action camera or a wearable camera for sports applications or the like
- A device for agriculture use, such as a camera for monitoring a condition of a field or crop.

The embodiment of the present disclosure is not limited to the above-described embodiments and various modifications may be made without departing from the gist of the technology of the present disclosure.

For example, a form in which all or some of the plurality of configuration examples described above are appropriately combined can be adopted.

Note that, the effects described in the present specification are merely examples and are not limited, and there may be effects other than those described in the present specification.

Note that the technology of the present disclosure can have the following configurations.

(1)

A solid-state imaging device including:
  a pixel including
    a photoelectric conversion element,
    a first capacitive element configured to hold a first signal level of the photoelectric conversion element, and
    a second capacitive element configured to hold a second signal level of the photoelectric conversion element;
  a reading circuit shared by a plurality of the pixels including a first pixel and a second pixel; and
  a vertical scanning circuit configured to control the pixel and the reading circuit, in which
  the vertical scanning circuit performs first control of simultaneously reading signal levels of different capacitive elements of the first and second capacitive elements in the first pixel and the second pixel.

(2)

The solid-state imaging device according to (1), in which
  the vertical scanning circuit simultaneously reads the second signal level of the first pixel and the first signal level of the second pixel after simultaneously reading the first signal level of the first pixel and the second signal level of the second pixel as the first control.

(3)

The solid-state imaging device according to (1) or (2), in which
  the reading circuit includes a reset transistor, an amplification transistor, and a selection transistor.

(4)

The solid-state imaging device according to any one of (1) to (3), in which
  the reading circuit is shared by four pixels including two pixels in a row direction and two pixels in a column direction.

(5)

The solid-state imaging device according to (4), in which
  the first pixel and the second pixel are two pixels arranged in the column direction, the row direction, or an oblique direction among the four pixels.

(6)

The solid-state imaging device according to (4) or (5), in which the vertical scanning circuit performs the first control by regarding predetermined two pixels of the four pixels as the first pixel and regarding remaining two pixels as the second pixel.

(7)

The solid-state imaging device according to any one of (1) to (6), further including:
an ADC configured to convert a signal level read by the reading circuit into a count value; and
a subtraction processing circuit configured to perform subtraction processing on the two converted count values, in which
the subtraction processing circuit performs subtraction processing on the count value corresponding to a sum of the first signal level of the first pixel and the second signal level of the second pixel and the count value corresponding to a sum of the second signal level of the first pixel and the first signal level of the second pixel.

(8)

The solid-state imaging device according to (7), further including
a saturation detection circuit configured to detect saturation of a signal level of the pixel.

(9)

The solid-state imaging device according to any one of (1) to (8), in which
in a pixel array unit in which the pixels are two-dimensionally arranged in a matrix, the vertical scanning circuit mixes a pixel that performs the first control and a pixel that performs second control of reading a luminance signal in units of one pixel.

(10)

The solid-state imaging device according to (9), in which
the vertical scanning circuit mixes the pixel that performs the first control and the pixel that performs the second control with respect to the plurality of pixels sharing the reading circuit.

(11)

The solid-state imaging device according to (9) or (10), in which
the vertical scanning circuit mixes the pixel that performs the first control and the pixel that performs the second control in units of rows of the pixel array unit.

(12)

The solid-state imaging device according to any one of (9) to (11), in which
the vertical scanning circuit mixes the pixel that performs the first control and the pixel that performs the second control in the same row of the pixel array unit.

(13)

The solid-state imaging device according to any one of (9) to (12), in which
the pixel that performs the first control operates at a higher frame rate than the pixel that performs the second control.

(14)

The solid-state imaging device according to any one of (1) to (13), in which
the vertical scanning circuit performs the first control after making exposure timings different between two pixels arranged in a first oblique direction and two pixels arranged in a second oblique direction different from the first oblique direction among the plurality of pixels sharing the reading circuit.

(15)

The solid-state imaging device according to (14), in which
moving object detection processing is performed on the basis of a result of the first control in which the exposure timings are different.

(16)

The solid-state imaging device according to any one of (1) to (15), further including
a frame signal processing circuit configured to generate a luminance image having a first resolution by using a spatial difference image having the first resolution according to the first control and a luminance image having a second resolution lower than the first resolution according to second control of reading a luminance signal in units of one pixel.

(17)

The solid-state imaging device according to any one of (1) to (16), further including
a frame signal processing circuit configured to generate a luminance image having a first resolution from a luminance/difference mixed image in which a luminance value by second control of reading a luminance signal in units of one pixel is embedded in some pixels of a spatial difference image having the first resolution by the first control.

(18)

The solid-state imaging device according to any one of (1) to (17), further including
a frame signal processing circuit configured to generate a luminance image at a first time by using a spatial difference image generated at the first time by the first control, a first luminance image generated at a time before the first time by second control of reading a luminance signal in units of one pixel, and a second luminance image generated at a time after the first time by the second control.

(19)

A method for driving a solid-state imaging device, the method including,
by the solid-state imaging device including:
a pixel including
a photoelectric conversion element,
a first capacitive element configured to hold a first signal level of the photoelectric conversion element, and
a second capacitive element configured to hold a second signal level of the photoelectric conversion element; and
a reading circuit shared by a plurality of the pixels including a first pixel and a second pixel,
performing first control of simultaneously reading signal levels of different capacitive elements of the first and second capacitive elements in the first pixel and the second pixel.

(20)

An electronic device including a solid-state imaging device, the solid-state imaging device including:
a pixel including
a photoelectric conversion element,
a first capacitive element configured to hold a first signal level of the photoelectric conversion element, and
a second capacitive element configured to hold a second signal level of the photoelectric conversion element;
a reading circuit shared by a plurality of the pixels including a first pixel and a second pixel; and
a vertical scanning circuit configured to control the pixel and the reading circuit, in which the vertical scanning circuit performs first control of simultaneously reading signal levels of different capacitive elements of the first and second capacitive elements in the first pixel and the second pixel.

REFERENCE SIGNS LIST

1 Solid-state imaging device
11 Pixel array unit
12 Vertical scanning circuit
13 Constant current source circuit unit
14 Column signal processing circuit
15 Timing control circuit
17 Output unit
20 Sharing unit
21 Pixel
22 Pixel drive line
23 Vertical signal line
41 Photoelectric conversion element
PD Photodiode
42 Transfer transistor
43 Reset transistor
44 FD
45 Amplification transistor
46 Current source transistor
47 Node (capacitive input node)
48 Capacitive element
49 Capacitive element
51 Selection transistor
52 Selection transistor
53 Sharing reset transistor
54 Sharing amplification transistor
55 Sharing selection transistor
56 Node (sharing amplification transistor node)
81 Current source
102 Digital signal processing unit
103 Signal line
111 Capacitive element
112 Capacitive element
113 Comparator
114 Counter
115 Counter
121 Subtraction processing circuit
122 Saturation detection circuit
123 Selection circuit
201 Frame signal processing circuit

The invention claimed is:

1. A solid-state imaging device comprising:
a pixel including
   a photoelectric conversion element,
   a first capacitive element configured to hold a first signal level of the photoelectric conversion element, and
   a second capacitive element configured to hold a second signal level of the photoelectric conversion element;
a reading circuit shared by a plurality of the pixels including a first pixel and a second pixel; and
a vertical scanning circuit configured to control the pixel and the reading circuit, wherein
the vertical scanning circuit performs first control of simultaneously reading signal levels of different capacitive elements of the first and second capacitive elements in the first pixel and the second pixel.

2. The solid-state imaging device according to claim 1, wherein
the vertical scanning circuit simultaneously reads the second signal level of the first pixel and the first signal level of the second pixel after simultaneously reading the first signal level of the first pixel and the second signal level of the second pixel as the first control.

3. The solid-state imaging device according to claim 1, wherein
the reading circuit includes a reset transistor, an amplification transistor, and a selection transistor.

4. The solid-state imaging device according to claim 1, wherein
the reading circuit is shared by four pixels including two pixels in a row direction and two pixels in a column direction.

5. The solid-state imaging device according to claim 4, wherein
the first pixel and the second pixel are two pixels arranged in the column direction, the row direction, or an oblique direction among the four pixels.

6. The solid-state imaging device according to claim 4, wherein
the vertical scanning circuit performs the first control by regarding predetermined two pixels of the four pixels as the first pixel and regarding remaining two pixels as the second pixel.

7. The solid-state imaging device according to claim 1, further comprising:
an ADC configured to convert a signal level read by the reading circuit into a count value; and
a subtraction processing circuit configured to perform subtraction processing on the two converted count values, wherein
the subtraction processing circuit performs subtraction processing on the count value corresponding to a sum of the first signal level of the first pixel and the second signal level of the second pixel and the count value corresponding to a sum of the second signal level of the first pixel and the first signal level of the second pixel.

8. The solid-state imaging device according to claim 7, further comprising
a saturation detection circuit configured to detect saturation of a signal level of the pixel.

9. The solid-state imaging device according to claim 1, wherein
in a pixel array unit in which the pixels are two-dimensionally arranged in a matrix, the vertical scanning circuit mixes a pixel that performs the first control and a pixel that performs second control of reading a luminance signal in units of one pixel.

10. The solid-state imaging device according to claim 9, wherein
the vertical scanning circuit mixes the pixel that performs the first control and the pixel that performs the second control with respect to the plurality of pixels sharing the reading circuit.

11. The solid-state imaging device according to claim 9, wherein
the vertical scanning circuit mixes the pixel that performs the first control and the pixel that performs the second control in units of rows of the pixel array unit.

12. The solid-state imaging device according to claim 9, wherein
the vertical scanning circuit mixes the pixel that performs the first control and the pixel that performs the second control in the same row of the pixel array unit.

13. The solid-state imaging device according to claim 9, wherein the pixel that performs the first control operates at a higher frame rate than the pixel that performs the second control.

14. The solid-state imaging device according to claim 1, wherein
the vertical scanning circuit performs the first control after making exposure timings different between two pixels arranged in a first oblique direction and two pixels arranged in a second oblique direction different from the first oblique direction among the plurality of pixels sharing the reading circuit.

15. The solid-state imaging device according to claim 14, wherein
moving object detection processing is performed on a basis of a result of the first control in which the exposure timings are different.

16. The solid-state imaging device according to claim 1, further comprising
a frame signal processing circuit configured to generate a luminance image having a first resolution by using a spatial difference image having the first resolution according to the first control and a luminance image having a second resolution lower than the first resolution according to second control of reading a luminance signal in units of one pixel.

17. The solid-state imaging device according to claim 1, further comprising
a frame signal processing circuit configured to generate a luminance image having a first resolution from a luminance/difference mixed image in which a luminance value by second control of reading a luminance signal in units of one pixel is embedded in some pixels of a spatial difference image having the first resolution by the first control.

18. The solid-state imaging device according to claim 1, further comprising
a frame signal processing circuit configured to generate a luminance image at a first time by using a spatial difference image generated at the first time by the first control, a first luminance image generated at a time before the first time by second control of reading a luminance signal in units of one pixel, and a second luminance image generated at a time after the first time by the second control.

19. A method for driving a solid-state imaging device including a pixel having a photoelectric conversion element and a reading circuit shared by a plurality of pixels, the method comprising:
holding a first signal level of the photoelectric conversion element using a first capacitive element,
holding a second signal level of the photoelectric conversion element using a second capacitive element; and
performing first control of simultaneously reading signal levels of different capacitive elements of the first and second capacitive elements in a first pixel and a second pixel of the plurality of pixels.

20. An electronic device comprising a solid-state imaging device, the solid-state imaging device including:
a pixel including
a photoelectric conversion element,
a first capacitive element configured to hold a first signal level of the photoelectric conversion element, and
a second capacitive element configured to hold a second signal level of the photoelectric conversion element;
a reading circuit shared by a plurality of the pixels including a first pixel and a second pixel; and
a vertical scanning circuit configured to control the pixel and the reading circuit, wherein
the vertical scanning circuit performs first control of simultaneously reading signal levels of different capacitive elements of the first and second capacitive elements in the first pixel and the second pixel.

* * * * *